United States Patent
Raman et al.

(10) Patent No.: US 11,733,982 B1
(45) Date of Patent: *Aug. 22, 2023

(54) DYNAMICALLY CHANGING INPUT DATA STREAMS PROCESSED BY DATA STREAM LANGUAGE PROGRAMS

(71) Applicant: Splunk Inc., San Francisco, CA (US)

(72) Inventors: Rajesh Raman, Palo Alto, CA (US); Arijit Mukherji, Fremont, CA (US); Kris Grandy, San Carlos, CA (US); Phillip Liu, Palo Alto, CA (US)

(73) Assignee: Splunk Inc., San Francisco, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/175,330

(22) Filed: Feb. 12, 2021

Related U.S. Application Data

(63) Continuation of application No. 15/697,451, filed on Sep. 7, 2017, now Pat. No. 10,949,180, which is a
(Continued)

(51) Int. Cl.
- *G06F 16/2455* (2019.01)
- *G06F 11/34* (2006.01)
(Continued)

(52) U.S. Cl.
CPC .............. *G06F 8/443* (2013.01); *G06F 9/466* (2013.01); *G06F 9/542* (2013.01); *G06F 11/07* (2013.01);
(Continued)

(58) Field of Classification Search
CPC .. G06F 8/344; G06F 16/24568; G06F 16/164; G06F 9/466; G06F 9/542;
(Continued)

(56) References Cited

U.S. PATENT DOCUMENTS

| 5,872,909 A | 2/1999 | Wilner et al. |
| 6,097,399 A | 8/2000 | Bhatt et al. |

(Continued)

FOREIGN PATENT DOCUMENTS

| AU | 2015328574 A1 | 4/2017 |
| AU | 2015364688 A1 | 6/2017 |

(Continued)

OTHER PUBLICATIONS

Gaganpreet Kaur, "Usage of Regular Expressions in NLP", [Online], pp. 168-174, [Retrieved from Internet on Apr. 8, 2023], <https://citeseerx.ist.psu.edu/document?repid=rep1&type=pdf&doi=83e2851bb3843ef8f7dfb9f882c8e0fdf5613751>, (Year: 2014).*

(Continued)

*Primary Examiner* — Ziaul A Chowdhury
(74) *Attorney, Agent, or Firm* — McDermott Will & Emery LLP

(57) ABSTRACT

An instrumentation analysis system processes data streams by executing instructions specified using a data stream language program. The data stream language allows users to specify a search condition using a find block for identifying the set of data streams processed by the data stream language program. The set of identified data streams may change dynamically. The data stream language allows users to group data streams into sets of data streams based on distinct values of one or more metadata attributes associated with the input data streams. The data stream language allows users to specify a threshold block for determining whether data values of input data streams are outside boundaries specified using low/high thresholds. The elements of the set of data streams input to the threshold block can dynamically change. The low/high threshold values can be specified as data streams and can dynamically change.

20 Claims, 24 Drawing Sheets

Related U.S. Application Data continuation of application No. 14/970,451, filed on Dec. 15, 2015, now Pat. No. 9,760,353.

(60) Provisional application No. 62/094,935, filed on Dec. 19, 2014.

(51) Int. Cl.

| | | |
|---|---|---|
| *G06F 11/30* | (2006.01) | |
| *G06F 9/54* | (2006.01) | |
| *G06F 8/41* | (2018.01) | |
| *G06F 16/16* | (2019.01) | |
| *G06F 11/07* | (2006.01) | |
| *G06F 9/46* | (2006.01) | |
| *G06F 11/36* | (2006.01) | |

(52) U.S. Cl.
CPC .......... *G06F 11/3086* (2013.01); *G06F 11/34* (2013.01); *G06F 11/3452* (2013.01); *G06F 11/3466* (2013.01); *G06F 11/3604* (2013.01); *G06F 16/164* (2019.01); *G06F 16/24568* (2019.01); *G06F 11/3006* (2013.01); *G06F 11/3072* (2013.01); *G06F 11/3409* (2013.01); *G06F 2201/81* (2013.01); *G06F 2201/835* (2013.01); *G06F 2201/86* (2013.01); *G06F 2201/88* (2013.01)

(58) Field of Classification Search
CPC .. G06F 11/07; G06F 11/3466; G06F 11/3086; G06F 11/3604; G06F 11/3409; G06F 2201/81; G06F 2201/835; G06F 2201/8688
See application file for complete search history.

(56) References Cited

U.S. PATENT DOCUMENTS

| | | |
|---|---|---|
| 7,269,824 B2 | 9/2007 | Noy et al. |
| 7,389,497 B1 | 6/2008 | Edmark et al. |
| 7,526,685 B2 | 4/2009 | Noy et al. |
| 7,716,530 B2 | 5/2010 | Verbowski et al. |
| 7,886,281 B2 | 2/2011 | Smith et al. |
| 7,979,245 B1 | 7/2011 | Bourlatchkov et al. |
| 8,095,917 B2 | 1/2012 | Stall |
| 8,117,175 B1 | 2/2012 | Johnson et al. |
| 8,136,124 B2 | 3/2012 | Kosche et al. |
| 8,176,480 B1 | 5/2012 | Spertus |
| 8,327,059 B2 | 12/2012 | Chen et al. |
| 8,381,039 B1 | 2/2013 | Osiecki et al. |
| 8,381,284 B2 | 2/2013 | Dang et al. |
| 8,396,886 B1 | 3/2013 | Tsinnelzon |
| 8,407,699 B2 | 3/2013 | Larkin et al. |
| 8,504,733 B1 | 8/2013 | Iyer et al. |
| 8,739,143 B2 | 5/2014 | Lafrance-Linden |
| 9,292,328 B2 | 3/2016 | Pratt et al. |
| 9,454,497 B2 | 9/2016 | Nakajima et al. |
| 9,479,414 B1 | 10/2016 | Rustad |
| 9,578,372 B2 | 2/2017 | Xu et al. |
| 9,665,474 B2 | 5/2017 | Li et al. |
| 9,715,410 B2 | 7/2017 | Bonzini et al. |
| 9,760,353 B2 | 9/2017 | Raman et al. |
| 9,804,830 B2 | 10/2017 | Raman et al. |
| 9,804,951 B2 | 10/2017 | Liu et al. |
| 9,845,632 B2 | 12/2017 | Liu et al. |
| 9,846,574 B2 | 12/2017 | Raman et al. |
| 9,846,632 B2 | 12/2017 | Liu et al. |
| 9,880,871 B2 | 1/2018 | Tsirkin et al. |
| 9,892,020 B1 | 2/2018 | Ophir et al. |
| 10,394,692 B2 | 8/2019 | Liu et al. |
| 10,394,693 B2 | 8/2019 | Liu et al. |
| 10,409,568 B2 | 9/2019 | Liu et al. |
| 10,437,705 B2 | 10/2019 | Liu et al. |
| 10,564,997 B2 | 2/2020 | Hong et al. |
| 11,010,278 B2 | 5/2021 | Liu et al. |
| 2002/0138663 A1 | 9/2002 | Ladwig |
| 2003/0093772 A1 | 5/2003 | Stephenson |
| 2005/0055322 A1 | 3/2005 | Masters et al. |
| 2005/0125710 A1 | 6/2005 | Sanghvi |
| 2005/0223368 A1 | 10/2005 | Smith et al. |
| 2006/0133428 A1 | 6/2006 | Guthrie et al. |
| 2006/0195420 A1* | 8/2006 | Kilroy .................. G06F 16/243 |
| 2006/0293777 A1 | 12/2006 | Breitgand et al. |
| 2007/0169055 A1 | 7/2007 | Greifeneder |
| 2008/0127149 A1 | 5/2008 | Kosche et al. |
| 2008/0270848 A1 | 10/2008 | Connally |
| 2009/0070633 A1* | 3/2009 | Staneff ................ G06F 11/3672 |
| | | 714/45 |
| 2009/0249308 A1 | 10/2009 | Li et al. |
| 2009/0271529 A1 | 10/2009 | Kashiyama et al. |
| 2009/0287729 A1 | 11/2009 | Chen et al. |
| 2010/0057735 A1 | 3/2010 | Srinivasan et al. |
| 2010/0138438 A1 | 6/2010 | Torikai et al. |
| 2010/0293535 A1 | 11/2010 | Andrade et al. |
| 2011/0007638 A1 | 1/2011 | Xu et al. |
| 2011/0302164 A1 | 12/2011 | Krishnamurthy et al. |
| 2012/0017002 A1 | 1/2012 | Andreasson et al. |
| 2012/0078975 A1 | 3/2012 | Chen et al. |
| 2012/0158925 A1 | 6/2012 | Shen et al. |
| 2012/0227004 A1 | 9/2012 | Madireddi |
| 2012/0290561 A1* | 11/2012 | Kobayashi .......... G06F 16/3344 |
| | | 707/E17.062 |
| 2012/0304172 A1 | 11/2012 | Greifeneder et al. |
| 2013/0103662 A1* | 4/2013 | Epstein ............... G06F 16/3329 |
| | | 707/706 |
| 2013/0179868 A1 | 7/2013 | Greifeneder et al. |
| 2013/0246746 A1 | 9/2013 | Gainey, Jr. et al. |
| 2013/0246771 A1 | 9/2013 | Farrell et al. |
| 2013/0247012 A1 | 9/2013 | Gainey, Jr. et al. |
| 2013/0263093 A1 | 10/2013 | Brandt et al. |
| 2013/0275814 A1 | 10/2013 | Nayak et al. |
| 2013/0283102 A1 | 10/2013 | Krajec |
| 2013/0290450 A1 | 10/2013 | Butler et al. |
| 2014/0006325 A1 | 1/2014 | Biem |
| 2014/0019598 A1 | 1/2014 | Krajec |
| 2014/0040213 A1 | 2/2014 | Rossi |
| 2014/0059210 A1 | 2/2014 | Gedik et al. |
| 2014/0095444 A1 | 4/2014 | Deshmukh et al. |
| 2014/0095541 A1 | 4/2014 | Herwadkar et al. |
| 2014/0157363 A1 | 6/2014 | Banerjee |
| 2014/0195861 A1 | 7/2014 | Singh et al. |
| 2014/0215443 A1 | 7/2014 | Voccia et al. |
| 2014/0282416 A1 | 9/2014 | Shepherd |
| 2014/0350888 A1 | 11/2014 | Gesmann |
| 2015/0286548 A1 | 10/2015 | Juli |
| 2016/0048464 A1 | 2/2016 | Nakajima et al. |
| 2016/0103665 A1 | 4/2016 | Liu et al. |
| 2016/0103757 A1 | 4/2016 | Liu et al. |
| 2016/0179488 A1 | 6/2016 | Raman et al. |
| 2016/0179588 A1 | 6/2016 | Raman et al. |
| 2016/0179799 A1 | 6/2016 | Raman et al. |
| 2016/0180079 A1 | 6/2016 | Sahita et al. |
| 2016/0224383 A1 | 8/2016 | Bonzini et al. |
| 2016/0224459 A1 | 8/2016 | Liu et al. |
| 2016/0266728 A1 | 9/2016 | Sankhavaram et al. |
| 2016/0283547 A1* | 9/2016 | Ridgway ............. G06F 16/9535 |
| 2016/0379003 A1 | 12/2016 | Kapoor et al. |
| 2017/0109197 A1 | 4/2017 | Coleman et al. |
| 2017/0147417 A1 | 5/2017 | Sasturkar et al. |
| 2017/0257399 A1 | 9/2017 | Mooring et al. |
| 2018/0011695 A1 | 1/2018 | Raman et al. |
| 2018/0046567 A1 | 2/2018 | Liu et al. |
| 2018/0129525 A1 | 5/2018 | Hong et al. |
| 2018/0247082 A1 | 8/2018 | Durham et al. |
| 2018/0307471 A1 | 10/2018 | Liu et al. |
| 2018/0307586 A1 | 10/2018 | Liu et al. |
| 2018/0373895 A9 | 12/2018 | Durham et al. |
| 2019/0034633 A1 | 1/2019 | Seetharamaiah et al. |
| 2019/0044971 A1 | 2/2019 | Sukhomlinov et al. |
| 2020/0042429 A1 | 2/2020 | Liu et al. |
| 2020/0042430 A1 | 2/2020 | Liu et al. |

(56) References Cited

U.S. PATENT DOCUMENTS

| | | | |
|---|---|---|---|
| 2020/0050437 | A1 | 2/2020 | Raman et al. |
| 2020/0050535 | A1 | 2/2020 | Liu et al. |
| 2020/0081737 | A1 | 3/2020 | Peter |

FOREIGN PATENT DOCUMENTS

| | | | |
|---|---|---|---|
| AU | 2016211697 | A1 | 8/2017 |
| CA | 2962760 | A1 | 4/2016 |
| CA | 3058839 | A1 | 6/2016 |
| CA | 2969131 | A1 | 5/2017 |
| CA | 2974386 | A1 | 7/2017 |
| CN | 101193055 | A | 6/2008 |
| CN | 104145459 | A | 11/2014 |
| CN | 106796520 | A | 5/2017 |
| CN | 107111527 | A | 8/2017 |
| CN | 107430545 | A | 12/2017 |
| EP | 0935233 | | 8/1999 |
| EP | 1780955 | | 5/2007 |
| EP | 3204848 | A1 | 8/2017 |
| EP | 3234776 | A1 | 10/2017 |
| EP | 3251015 | A1 | 12/2017 |
| JP | 2000-215130 | A | 8/2000 |
| JP | 2002-278780 | A | 9/2002 |
| JP | 2004-348670 | A | 12/2004 |
| JP | 2004-348740 | A | 12/2004 |
| JP | 2008-123426 | A | 5/2008 |
| JP | 2009-266007 | A | 11/2009 |
| JP | 2010-134599 | A | 6/2010 |
| JP | 2011-180957 | A | 9/2011 |
| JP | 2012-164369 | A | 8/2012 |
| JP | 2017-535012 | A | 11/2017 |
| JP | 2018-506104 | A | 3/2018 |
| JP | 2018-508881 | A | 3/2018 |
| WO | 2011/158372 | A1 | 12/2011 |
| WO | 2012/128388 | A1 | 9/2012 |
| WO | WO 2013/186831 | A1 | 12/2013 |
| WO | WO 2012/046316 | A1 | 2/2014 |
| WO | 2014/109038 | A1 | 7/2014 |
| WO | WO 2014/113273 | A2 | 7/2014 |
| WO | WO 2014/145092 | | 9/2014 |
| WO | WO 2016/057211 | A1 | 4/2016 |
| WO | WO 2016/100534 | A1 | 6/2016 |
| WO | WO 2016/123126 | A1 | 8/2016 |

OTHER PUBLICATIONS

India Patent Office—First Examination Report dated May 10, 2022 for related Indian patent application No. 202148020122, 7 pgs.
Japan IP Office, 1st Examination Report for related Japanese Patent Application No. 2020-126662, dated Aug. 17, 2021, Japanese and English translations—8 pgs.
Japan IP Office, 1st Examination Report for related Japanese Patent Application No. 2020-137011, dated Sep. 14, 2021, Japanese and English translations—12 pgs.
Australian IP Office, 1st Examination Report for related Australian Patent Application No. 2015328574, dated Apr. 17, 2020, 3 pgs.
Australian IP Office, 2nd Examination Report for related Australian Patent Application No. 2015328574, dated Aug. 19, 2020, 3 pgs.
Australian IP Office, 1st Examination Report for related Australian Patent Application No. 2020200713 dated Oct. 16, 2020, 5 pgs.
Australian IP Office, 2nd Examination Report for related Australian Patent Application No. 2020200713 dated Dec. 14, 2020, 4 pgs.
Australian IP Office, 1st Examination Report for related Australian Patent Application No. 2015364688 dated Jun. 9, 2020, 4 pgs.
Indian Patent Office, First Examination Report for related Indian Application No. 201747025793—Indian and English translations—dated Jul. 11, 2020,8 pgs.
Indian Patent Office, First Examination Report for related Indian Application No. 20174701799—Indian and English translations—dated Sep. 18, 2020, 8 pgs.
Indian Patent Office, First Examination Report for related Indian Application No. 20174700939—Indian and English translations—dated Aug. 12, 2020, 13 pgs.
Chinese National IP Administration, Office Action for related Chinese Patent Application No. 201580055066.3—Chinese and English translations—dated Aug. 5, 2019, 16 pgs.
Chinese National IP Administration, 3rd Office Action for related Chinese Patent Application No. 201580055066.3—Chinese and English translations—dated Oct. 12, 2020, 26 pgs.
Chinese National IP Adminstration, Office Action for related Chinese Patent Application No. 201680016597.6—Chinese and English translation—dated Mar. 21, 2020, 19 pgs.
Chinese National IP Administration, 1st Office Action for related Chinese Patent Application No. 201580069546.5—Chinese and English translations—dated Apr. 3, 2020, 7 pgs.
Chinese National IP Administration, 2nd Office Action for related Chinese Patent Application No. 201580069546.5—Chinese and English translations—dated Dec. 3, 2020, 4 pgs.
Canadian IP Office, 1st Examination Report for related Canadian Application No. 2,974,386, dated Jun. 1, 2018, 5 pgs.
Canadian IP Office, 2nd Examination Report for related Canadian Application No. 2,974,386, dated Apr. 5, 2019, 4 pgs.
Canadian IP Office, 1st Examination Report for related Canadian Application No. 2,962,760, dated Feb. 6, 2018, 3 pgs.
Canadian IP Office, 2nd Examination Report for related Canadian Application No. 2,962,760, dated Jan. 24, 2020, 3 pgs.
Canadian IP Office, 1st Canadian Office Action, Canadian Application No. 2,969,131, dated Mar. 27, 2018, 4 pgs.
Canadian IP Office, 1st Examination Report for related Canadian Application No. 3,058,839 dated Nov. 12, 2020, 8 pgs.
European Patent Office, European Extended Search Report, European Application No. 15848505.2, dated Jul. 9, 2018, 9 pgs.
European Patent Office, European Extended Search Report, European Application No. 16743976.9, dated Jul. 9, 2018, 9 pgs.
European Patent Office, Extended European Search Report and Opinion, EP Patent Application Not 15870999.8, dated Aug. 21, 2018, 10 pgs.
European Patent Office, Extended European Search Report and Opinion for related EP Patent Application No. 20182552.8 dated Dec. 4, 2020, 12 pgs.
PCT International Search Report and Written Opinion, PCT Application No. PCT/US2015/051458, dated Dec. 17, 2015, 21 pgs.
PCT International Search Report and Written Opinion, PCT Application No. PCT/US2016/014957, dated Apr. 21, 2016, 30 pgs.
PCT Invitation to Pay Additional Fees, PCT Application No. PCT/US2015/66132, dated Feb. 22, 2016, 2 pages.
PCT International Search Report and Written Opinion, PCT Application No. PCT/US2015/66132, dated Apr. 21, 2016, 17 pgs.
Abadi, D. et al., "The Design of the Borealis Stream Processing Engine," Proceedings of the 2005 CIDR Conference, 2005, 13 pgs.
Bai, Y. et al., "A Data Stream Language and System Designed for Power and Extensibility," CIKM '06, ACM, Nov. 5-11, 2006, 10 pgs.
Cherniack, M. et al., "Scalable Distributed Stream Processing," Proceedings of the 2003 CIDR Conference, 2003, 12 pgs.
Esmaili, K.S., "Data Stream Processing in Complex Application," Doctoral Thesis Dissertation, ETH Zurich, 2011, 193 pgs.
Gedik, B. et al., "SPADE: The System S Declarative Stream Processing Engine," SIGMOD'08, Jun. 9-12, 2008, pp. 1123-1134.
Jain, N. et al., "Towards a Streaming SQL Standard," VLDB '08, Aug. 24-30, 2008, 12 pages.
Stonebraker, M. et al., "The 8 Requirements of Real-Time Stream Processing," ACM SIGMOD Record, 2005, 6 pages.
Thies, W. et al., "StreamIt: A Language for Streaming Applications," Lecture Notes in Computer Science, Mar. 28, 2002, pp. 179-196, vol. 2304.
Xu, W. et al., "A Flexible Architecture for Statistical Learning and Data Mining from System Log Streams," In Proceedings: Temporal Data Mining, Algorithms, Theory and Applications, IEEE, 2004, May be retrieved from the Internet at<URL:http://research.microsofl.com/pubs/143357/paper.pdf>.
Zhang, D. et al., "Temporal Aggregation Over Data Streams Using Multiple Granularities," Advances in Database Technology—EDBT 2002, vol. 2287 if the series Lecture Notes in Computer Science,

(56) References Cited

OTHER PUBLICATIONS

Mar. 14, 2002, pp. 646-663, [Online] Retrieved from the Internet<URL:http://www.zgking.com:8080/home/donghui/publications/hta.-pdf>.

Chinese National IP Administration, Office Action for related Chinese Patent Application No. 201580055066.3—Chinese and English translations—dated Jun. 2, 2020, 7 pgs.

European Patent Office—Extended European Search Report for related European Patent Application No. 21209283.7, dated Mar. 14, 2022; 11 pgs.

Japan IP Office, 2nd Examination Report for related Japanese Patent Application No. 2020-126662, dated Mar. 22, 2022, Japanese and English translations—6 pgs.

Li, Ming, et al. "Event stream processing with out-of-order data arrival." 27th International Conference on Distributed Computing Systems Workshops (ICDCSW'07).IEEE,2007.

Office Action issued in corresponding U.S. Appl. No. 17/515,272 dated Dec. 19, 2022 (27 pages).

Japan IP Office, 2nd Examination Report dated Sep. 13, 2022, Japanese and English translations—11 pgs.

Japan IP Office, 2nd Examination Report dated Sep. 13 Feb. 12, 2023, Japanese and English translations—13 pgs.

Australian IP Office, 1st Exmination Report for related Australian Patent Application No. 2022201801, dated Mar. 31, 2023, 3 pgs.

\* cited by examiner

DYNAMICALLY CHANGING INPUT DATA STREAMS PROCESSED BY DATA STREAM LANGUAGE PROGRAMS

CROSS REFERENCES TO RELATED APPLICATIONS

This present application claims the benefit of priority under 35 U.S.C. § 120 as a continuation of U.S. patent application Ser. No. 15/697,451, filed Sep. 7, 2017, which is a continuation of U.S. patent application Ser. No. 14/970,451, filed Dec. 15, 2015, which claims the benefit of U.S. Provisional Patent Application No. 62/094,935 filed Dec. 19, 2014, each of which is incorporated by reference in its entirety.

BACKGROUND

This disclosure relates to a data stream processing in general and more specifically to a data stream processing language for processing data streams received from instrumented software.

Software developers monitor different aspects of software they develop by instrumenting the software. These include performance of the software, errors encountered during execution of the software, significant events encountered during execution of the software, information describing which parts of code are being executed and which parts are not being executed, and so on. Conventional techniques for instrumenting code include statements in the code that log different types of information to log files or print information on screens. This technique is suitable for simple applications, for example, applications having a simple flow of execution that execute on a single processor. However, these techniques for instrumenting software are inadequate for complex applications that may be distributed across multiple systems, each system executing multiple processes or threads of execution.

Another conventional technique for instrumenting such complex systems is to use help of experts in instrumenting code. Certain vendors provide expert services that help with instrumentation of code. However, these vendors typically provide standard services that are often not very flexible. Furthermore, these vendor based solutions have significant overhead in terms of time needed by the vendor to instrument code. Accordingly, these solutions are suited towards a slow development cycle, for example, a year-long development cycle. However, software development and release cycles for software products have become short. For example, there are several online systems in which software developers make changes on a monthly, weekly, or even daily basis and deploy them. Due to the significant overhead of vendor based instrumentation solutions, developers find it difficult to use these services in a fast paced development environment.

Furthermore, conventional techniques for instrumenting code cause significant delays in assimilating the information, storing the information, and analyzing the information to generate reports. As a result, there can be significant delay between the time that a problem occurs in the software and the time that the problem is detected via instrumentation of the code. Accordingly, conventional systems for generating reports based on instrumentation of software are often inadequate in fast paced development cycles of complex applications.

SUMMARY

Embodiments describe an instrumentation analysis system that processes data streams based on instructions specified in a data stream language. The system stores metadata describing a plurality of data streams. The system receives a data stream language program for execution. The data stream language program comprises a set of instructions specified using a data stream language. The instructions include a find block associated with a search expression that is based on metadata attributes associated with received data streams. The system evaluates the search expression to identify a set of data streams conforming to the search expression. The system repeatedly executes the data stream language program by performing the following steps. The system receives data values from each data stream of the identified set of data streams. The system executes each block of the data stream language program and generates result data values based on the execution. The result values correspond to result data streams generated by the data stream language program. The system stores the one or more result data values.

In an embodiment, the find block is the first block of a data stream language program. The system evaluates the find block repeatedly. The set of data streams identified by the find block can change from one evaluation of the find block to another. The find block may be evaluated at a rate different from the rate of execution of the rest of the blocks of the data stream language program.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
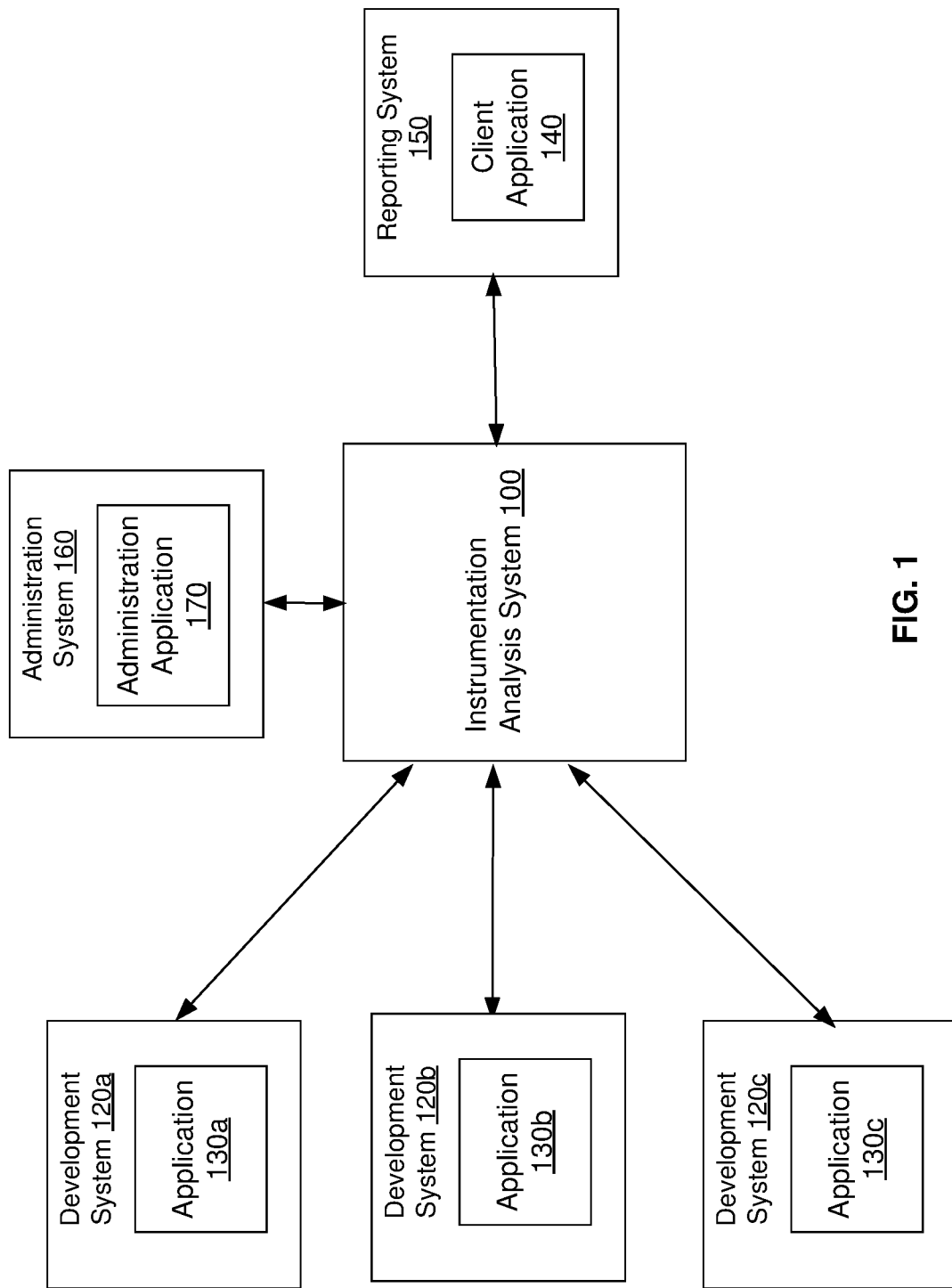
FIG. 1 shows the overall system environment for reporting based on instrumented software, according to an embodiment.

FIG. 1 shows the overall system environment for reporting based on instrumented software, according to an embodiment. The overall system environment includes an instrumentation analysis system 100, one or more development systems 120, an administration system 160, and a reporting system 150. In other embodiments, more or less components than those indicated in FIG. 1 may be used. For example, development system 120, administration system 160, and reporting system 150 may interact with instrumentation analysis system 100 via a network (not shown in FIG. 1). Furthermore, there may be more or less instances of each system shown in FIG. 1, for example, there may be multiple reporting systems 150.

FIG. 1 and the other figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral (e.g. "130" in the text refers to reference numerals "130a" and/or "130b" in the figures).

The instrumentation analysis system 100 receives data comprising values of metrics sent by different development systems 120 (the instrumentation analysis system 100 may also be referred to herein as an analysis system or a data analysis system). A development system 120 executes instrumented software, for example, application 130. Although, application 130 is shown in FIG. 1 as an example of instrumented software, the techniques disclosed herein are not limited to application software but are applicable to other kinds of software, for example, server software, software executing on client devices, websites, and so on. Furthermore, a development system 120 comprises any computing system that is configured to execute instrumented software, whether or not it is used for development of new software. For example, the development system 120 may be a computing system used for testing purposes, staging purposes, or any production system executing in an enterprise.

The software executing on a development system 120 is configured to send information generated as a result of instrumenting the software to instrumentation analysis system 100. For example, the application 130 may send values corresponding to various metrics as they are generated to instrumentation analysis system 100. The application 130 may send group values of metrics and send them periodically to instrumentation analysis system 100. Different applications 130 may send the same metric or different metrics at different rates. The same application may send different metrics at different rates. The application 130 sends data to the instrumentation analysis system 100 by invoking application programming interface (API) supported by the instrumentation analysis system 100.

A software program may be instrumented to add counters or gauges to the application. A counter comprises instructions that store a value that is incremented upon occurrence of certain event in the software. The counter may be used to determine the number of times a particular part of the code is executed, for example, a function or a method, a particular branch of a conditional code, an exception, a loop, and so on.

Typically a counter value changes monotonically, for example, a counter value may increase (or decrease) monotonically. For example, if the counter tracks the number of times an event has occurred since the system started execution, the counter value increases each time the occurrence of the event is detected by the system. Values of a counter may be compared to determine the change in the particular counter value at two different points in time. For example, the number of times a particular event occurs within a time interval between times t1 and t2 may be determined by computing the change in a corresponding counter value from t1 to t2. The APIs of the instrumentation analysis system may be invoked by the application 130 to send the current value of the counter to the instrumentation analysis system 100.

Following is an example of instrumented code of an application 130. The following instruction included in the code being instrumented creates a counter object for tracking count of an action or entities.

counter1=createCounter(source="web1", metric="metric1");

The above instruction creates a counter object and assigns it to the variable counter1. The counter object is associated with a source "web1" and metric "metric1." In an embodiment, the source and the metric values uniquely identify the data stream associated with the counter (or a gauge). In other embodiments, more or fewer key value pairs may be used to uniquely identify a data stream.

One or more of the values specified during creation of a counter are received when data corresponding to the counter is sent by the instrumented code to the instrumentation analysis system 100. Embodiments allow the application 130 to be instrumented so as to reduce the amount of information sent with each data stream. This reduces the amount of overhead introduced in the application 130 as a result of instrumenting the code.

The instrumented code of application 130 may include instructions to update the counter value at various places in the code. For example, the counter counter1 may be incremented by executing the instruction "counter1.increment( )." The counter may be incremented to track various actions or entities associated with the code. For example, the counter may be incremented whenever a particular function or method is called, the counter may be incremented whenever a particular branch of a conditional expression is executed, the counter may be incremented whenever an object of a particular type is created, for example, in a constructor of an object. The increment instruction of the counter may be called conditionally, for example, if a function is invoked with a particular combination of parameters. The application 130 communicates the counter value to the instrumentation analysis system 100 by invoking an API of the instrumentation analysis system 100.

A gauge comprises instructions to measure certain runtime characteristics of the application 130, for example, heap size, number of cache misses or hits, active memory used, CPU (central processing unit) utilization, total time taken to respond to a request, time taken to connect to a service, and so on. A gauge may also be used to track certain application specific parameters or business related values, for example, number of transactions, number of users, and so on. The gauge may be invoked periodically based on an interval that is configurable. The value of the gauge is sent to instrumentation analysis system 100 periodically.

The administration system 160 allows a privileged user, for example, a system administrator to associate data streams with metadata. The administration system 160 comprises the administration application 170 that provides a user interface for a system administrator to specify the metadata. The metadata comprises properties, for example, name-value pairs. The instrumentation analysis system 100 receives metadata describing data streams and stores the metadata. The ability to specify metadata describing data streams independently from the data received from each data stream provides several benefits in generating reports based on the data stream.

As an example, the instrumentation analysis system 100 can receive modifications to metadata describing each data stream without requiring any modifications to the instrumented software of the application 130. As a result, the instrumentation analysis system 100 receives specifications of new reports and modifications to existing reports and generates results based on the new/modified reports without requiring the developers to modify applications 130.

This provides for a new paradigm for instrumenting software since the developers do not need to consider the types of reports that need to be generated while adding instructions to instrument the software. The developers simply instrument their software to generate raw data that can be combined in various ways in the generated report. Systems and methods for real time reporting based on instrumentation of software are described in the U.S. patent application Ser. No. 14/800,677, filed on Jul. 15, 2015 which is incorporated by reference hereby in its entirety.

Furthermore, the persons that are experts at generating the instrumented software can be different from the software developers. For example, an expert at data analysis who is not a developer can define the metadata for the data streams and generate reports without being involved in the development process. This is significant because the skills required for analyzing data are typically different from the skills required for developing software.

Furthermore, the instrumentation analysis system 100 can also receive and process reports built on top of existing reports by composing existing reports and adding new analytics functionality. The instrumentation analysis system 100 generates results of the new reports and sends them for presentation in real-time as the instrumentation analysis system 100 receives data streams from instrumented software. The instrumentation analysis system 100 generates these additional reports and modifies existing reports without requiring any modifications to the instrumented code of application 130.

Furthermore, the instrumentation analysis system 100 provides separation of the metadata describing the data streams from the data of the data streams. Accordingly, the amount of data that needs to be transmitted from the development systems 120 to the instrumentation analysis system 100 is reduced. Each application 130 transmits only the data values of the metrics and information identifying the metric. The metadata information is received separately from a source independent of the data source of the data streams. Accordingly, any amount of metadata may be introduced without increasing the amount of data of each data stream.

The reporting system 150 may be a client device. The reporting system 150 includes a client application 140 that allows a user to interact with the instrumentation analysis system 100. In an embodiment, the client application 140 is an internet browser, which may include client side code (e.g., Java Script) for accessing the instrumentation analysis system 100. In other embodiments, client application 140 is a proprietary application developed for interacting with the instrumentation analysis system 100.

The reporting system 150 can be a conventional computer system (e.g., a desktop or laptop computer), a tablet, or a device having computer functionality such as a personal digital assistant (PDA), a mobile telephone, a smart phone or another suitable device. The reporting system 150 interacts with instrumentation analysis system 100 via a network. The network may comprise any combination of local area and/or wide area networks, using both wired and/or wireless communication systems. In one embodiment, the network uses standard communications technologies and/or protocols.

The instrumentation analysis system 100 may be hosted on a computing system that includes one or more processors, memory, secondary storage and input/output controller. The computing system used for hosting the instrumentation analysis system 100 is typically a server class system that uses powerful processors, large memory, and fast input/output systems compared to a typical computing system used, for example, as a reporting system 150.

In an embodiment, data from several development systems 120 may be consolidated, for example, by a server and the combined data sent to the instrumentation analysis system 100. For example, an enterprise may install a server that receives data stream internally from different development systems 120 and sends the combined data in a batch form to the instrumentation analysis system 100 periodically. This allows efficiency of external communication from the enterprise. However this configuration may result in delay in communicating information to the instrumentation analysis system 100 and the corresponding delay in reporting data by the reporting system 150.

Associating Dimensions with Data Streams

A data stream may be identified by using a set of coordinates representing values of dimensions associated with data streams. A dimension refers to a property of data streams that can take one of a set of values. Each data stream may be associated with a value for a dimension. For example, a dimension can be a source of a data stream or a metric name associated with a data stream. A source of a data stream may be identified by a server name, a service name, and so on. Examples of metric names are cpu (central processing unit) load, cache misses, cache hits, and so on. A value of a dimension is also referred to as a coordinate value of the data stream. A coordinate value may be represented as a metadata attribute stored in the metadata store 230. Given the two dimensions of source and metric, a data stream may be identified by providing the two coordinates representing the source and the metric, for example, (server1, cpu_load) or (server2, memory_usage).

A data stream may be characterized by multiple dimensions (i.e., more than the two dimensions described above, i.e., source and metric name). For example, if each server has multiple cpus, a dimension cpu_id may be included. Accordingly, each data stream obtained from a system may be characterized by (source_id, cpu_id, metric_name), i.e., a source identifier, a cpu identifier, and a name for the metric. Examples of data streams identified using three coordinates include (server1, cpu1, load), (server1, cpu2, load), (server2, cpu1, load), (server2, cpu2, load) and so on.

As another example of a dimension, a system may define customer name as a dimension. The name of the customer may be reported by the instrumented software, for example, based on the configuration parameters of the instrumented software executing on a development system 120. The customer name may be specified for the instrumented software using a system property. The instrumented software includes the customer name when it identifies a data stream associated with that particular customer. The ability to associate a data stream with a customer allows the instrumentation analysis system to perform customer specific analysis, for example, report on usages of systems for each customer, identify customers reporting more than a threshold number of errors and so on.

A data stream may be obtained from instrumented software or may be generated as a result of execution of blocks of a data stream language program within the instrumentation analysis system. A data stream may also comprise data stored in the instrumentation analysis system, for example, in a data store (such as a time series data store 260 described herein).

System Architecture of the Instrumentation Analysis System

Figure 2:
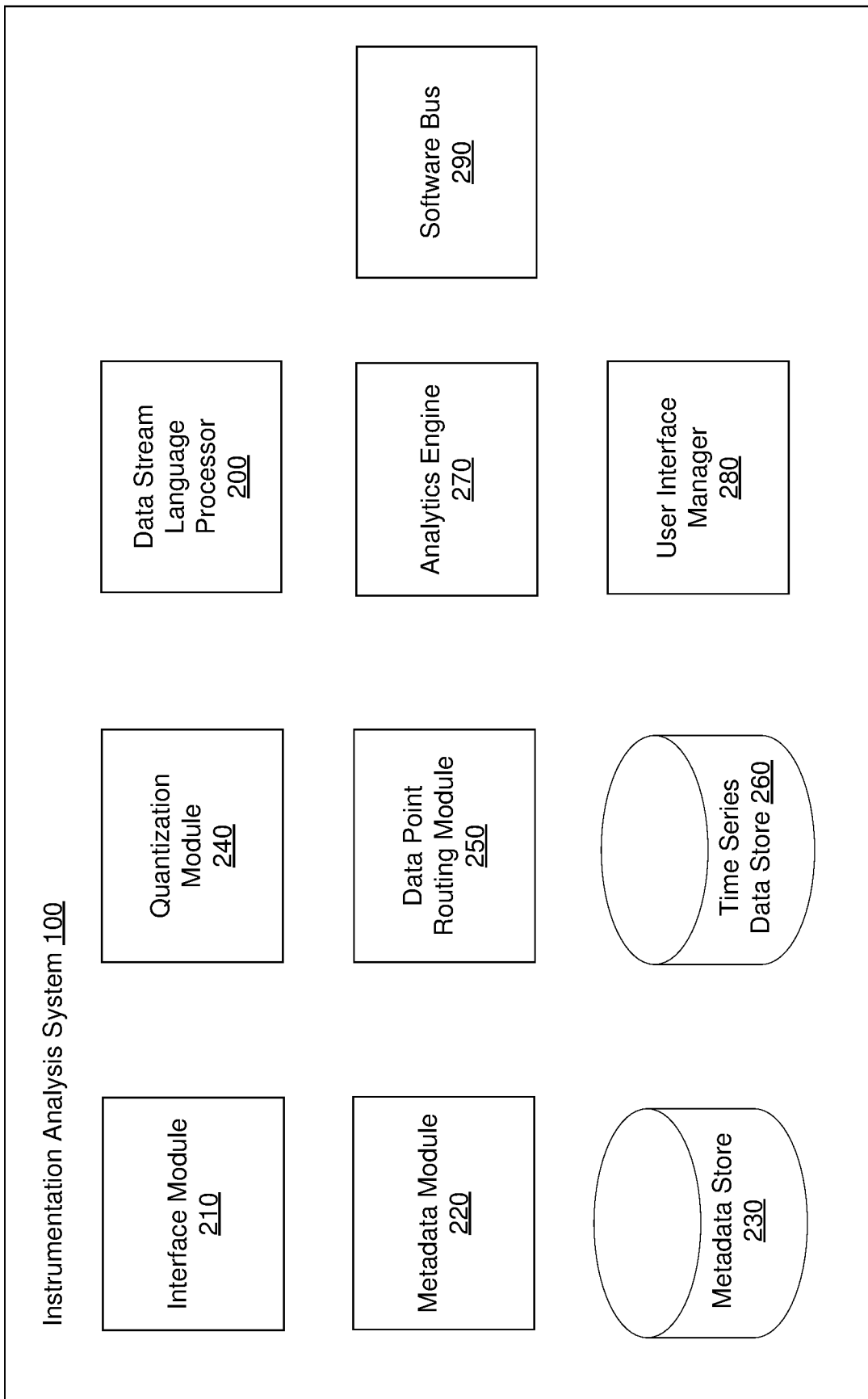
FIG. 2 shows the architecture of a system for executing a data stream language program for processing data streams received from instrumented software, according to an embodiment.

FIG. 2 shows the architecture of a system for executing a data stream language program for processing data streams received from instrumented software, according to an embodiment. The instrumentation analysis system 100 includes an interface module 210, a quantization module 240, metadata module 220, metadata store 230, a data point routing module 250, an analytics engine 270, a user interface manager 280, a data stream language processor 200, a time series data store 260, and software bus 290. In other embodiments, the instrumentation analysis system 100 may include other modules not described herein. Functionality indicated as provided by a particular module may be implemented by other modules instead.

The interface module 210 receives requests from external systems, for example, development systems 120 that communicate with the instrumentation analysis system 100. The interface module 210 supports various application programming interfaces (APIs) that external systems can invoke. The interface module 210 can receive and process data provided by applications 130 that are instrumented using functionality provided by different vendors, so long as the instrumented code sends the information in a format that can be processed by the interface module 210.

The interface module 210 receives data in the form of data streams from one or more development systems 120. In an embodiment, the interface module 210 receives data and represents the incoming data as tuples. Accordingly, each data stream is represented as a plurality of tuples, each tuple representing a data point. A tuple of data received by the interface module 210 comprises various elements. A tuple of data includes a metric identifier, for example, a name of the metric corresponding to the tuple and a value of the metric. The tuple of data received may further comprise other elements, for example, a timestamp corresponding to the time that the data was captured by the application 130 sending the data, one or more properties associated with the data.

In an embodiment, the timestamp associated with a tuple represents the time that the data value was received by the instrumentation analysis system 100. The properties associated with the data may be provided in the form of name, value pairs. These properties may provide additional information describing the data received, for example, information describing the source of the data such as a host name, server name, device name, or service name associated with the source, a method or function name associated with the data, an application instance identifier, and so on.

In an embodiment, the interface module 210 generates and assigns an identifier to records received by the interface module 210. The identifier is referred to herein as a time series identifier (also referred to herein as a TSID or tsid). A unique time series identifier is assigned to all tuples matching a metric name and a set of properties received with the tuple. Accordingly, a tuple (metric name, properties, metric value, timestamp) gets mapped to a tuple (tsid, metric value, timestamp). For example, if a tuple provides a metric name m1, and a hostname h1, all tuples with metric name m1 and hostname h1 are assigned the same time series identifier. Accordingly, the tsid uniquely identifies all tuples of a data stream received by the instrumentation analysis system 100.

The quantization module 240 processes data values received so as to transform an input time series of data in which data is available at arbitrary time intervals to a time series in which data is available at regular time intervals. For example, the data values received in an input time series may occur at irregular interval, however, the quantization module 240 processes the data of the time series to generate a time series with data occurring periodically, such as every second, or every 5 seconds, or every 15 seconds, and so on. This process is referred to herein as quantization of the time series. In an embodiment, the interface module 210 creates multiple threads or processes, each thread or process configured to receive data corresponding to a data stream. Each thread or process invokes the quantization module 240 to perform quantization of the data received for each data stream for each time interval. Systems and methods for quantization of data streams of instrumented software are described in the U.S. patent application Ser. No. 14/800,679, filed on Jul. 15, 2015 which is incorporated by reference hereby in its entirety.

The metadata module 220 receives and stores metadata information describing various data streams received from the development systems 120. In an embodiment, the metadata stored in the metadata module 220 is received from a user, for example, a system administrator interacting with the instrumentation analysis system 100 using the administration system 160.

The metadata may be represented as name-value pairs. In an embodiment, the metadata is represented as metadata objects, each object defining a set of properties that may be represented as name-value pairs. A set of data streams may be associated with the metadata object. Accordingly, all properties represented by the metadata object are associated with each data stream that is associated with the metadata object.

The metadata datastore 230 stores the metadata objects and their associations with the data streams. The metadata datastore 230 stores an identifier (ID) for each metadata object and the properties represented by the metadata object. In an embodiment, each data stream is associated with a time series identifier that uniquely identifies the data stream. The metadata datastore 230 stores an index that maps each metadata object to a set of time series identifier values. The metadata store 230 may receive instructions to modify a metadata object. For example, the metadata store 230 may receive instructions to modify, add or delete some properties represented by a metadata object. Alternatively, the metadata store 230 may receive instructions to modify the mapping from a metadata object to a data stream. For example, the metadata store 230 may receive instructions to associate a data stream with a metadata object or delete an association between a metadata object and a data stream.

In an embodiment, the metadata store 230 is represented as a relational database but may be represented as any other type of database or data store. For example, the metadata store 230 may be a relational database storing tables that map metadata object IDs to time series IDs identifying data streams. Other database tables may store the properties associated with each metadata object as a mapping from metadata object ID to each property represented as a name-value pair.

The user interface manager 280 renders the user interface for allowing users to specify the parameters of a data stream language program and to present results of execution of the data stream language program. The user interface manager 280 may display real-time results of a data stream language program as one or more charts that are periodically updated as the data of the data streams is received. The user interface manager 280 also presents a user interface that allows users to specify a data stream language program visually rather than textually. Examples of screenshots of user interfaces presented by the user interface manager 280 are described herein.

The time series data store 260 stores data received from various sources, for example, development systems 120. The time series data store 260 is also referred to herein as time series database (or TSDB). In an embodiment, the time series data store 260 also stores the time series data after the data is quantized. The time series data store 260 may also store rollup data for each time series. The time series data store 260 also stores results of various analytics requests, for example, results of various reports requested by user. The analytics engine 270 computes results for certain reports, for example, moving averages over intervals of time by combining data stored in the time series data store 260 with new data obtained as data stream from various sources.

The software bus 290 provides a mechanism for modules of the instrumentation analysis system 100 to provide data of data streams to other modules of the instrumentation analysis system 100. A data stream language program may send a data stream to the software bus 290. Other modules, for example, fetch module 320, find module 310, window module 380, and so on can read the data from the software bus 290 and perform further processing on the data. For example, a data stream output of a data stream language program published on the software bus 290 may be identified by a find block of another data stream language program executing as a job.

The data stream language processor 200 executes programs specified using the data stream language. The data stream language processor 200 receives a data stream language program, parses the data stream language program to validate the program. The data stream language processor 200 generates a representation of the data stream language program and executes the data stream language program using the representation.

The requests specified using the data stream language is a query based on the metadata associated with data received from various development systems 120. The data stream language supports various types of analytic functions, for example, aggregations and transformations. The data stream language provides the ability to compose various functions including aggregations and transformations in various ways. In an embodiment, the data stream language processor 200 parses programs specified using the data stream language, generates an executable representation of the program, and executes the generated representation.

Data Stream Language

A program specified using the data stream language comprises units of computation called blocks. Each block is associated with a particular processing or computation performed by the data block. Each block may also have one or more input ports and one or more output ports. A block receives input via an input port, performs certain computation using the data and sends the result of the computation to the output port. This process is repeated at a pre-specified periodicity. Accordingly, an input port acts as a mechanism to provide data to the block and an output port acts as a mechanism to output data of the block.

In an embodiment, each block is associated with a type of the block. The type of the block determines the computation performed by the block. The types of blocks supported by the data stream language include a find block, a fetch block, a statistical computation block, a threshold block, and so on. A block may be associated with certain configuration parameters. For example, a find block may take an expression as input. A data stream language program includes instances of a type of block. For example, a find block with a particular search expression is an instance of the find block that is included in a data stream language program.

In an embodiment, an input port of a block is identified with character "?" and an output port is identified with character "!". Other embodiments may identify the input/output ports using other syntax. For example, if a block B1 has input ports in1 and in2, a specific input port (say in2) may be identified as "B1?in2". Similarly, if block B1 has output ports out1 and out2, a specific output port (say out2) can be specified as "B2!out2". If a block has a single input/output port, the data stream language program may not identify the port. For example, if block B2 has a single input port, the input port may be referred to as "B2". Similarly, if block B2 has a single output port, the output port may be referred to as "B2".

Two blocks may be connected by specifying that the output of one block is provided as input of the other block. Accordingly, a data stream language program can be considered a network of blocks. In an embodiment, the connection between two blocks is specified using an arrow between the two blocks. For example, if B1 and B2 both have a single input port and a single input port, "B1->B2" specifies that the output of B1 is provided as input of block B2. Similarly, if B1 has two output ports out1 and out2 and B2 has two input ports i1 and in2, the out1 port of B1 may be connected to the in2 port of B2 by the expression "B1!out1->B2?in2".

The data stream language processor 200 may execute multiple jobs based on a data stream language program. Each job may be associated with a start time, an end time, and a periodicity. Accordingly, the job is executed from the start time until the end time at intervals specified by the periodicity. The periodicity specifies the rate at which data is processed by the data stream language program. A user may specify different jobs for execution based on the same data stream language program, each job associated with different start time, end time, and periodicity.

Figure 3:
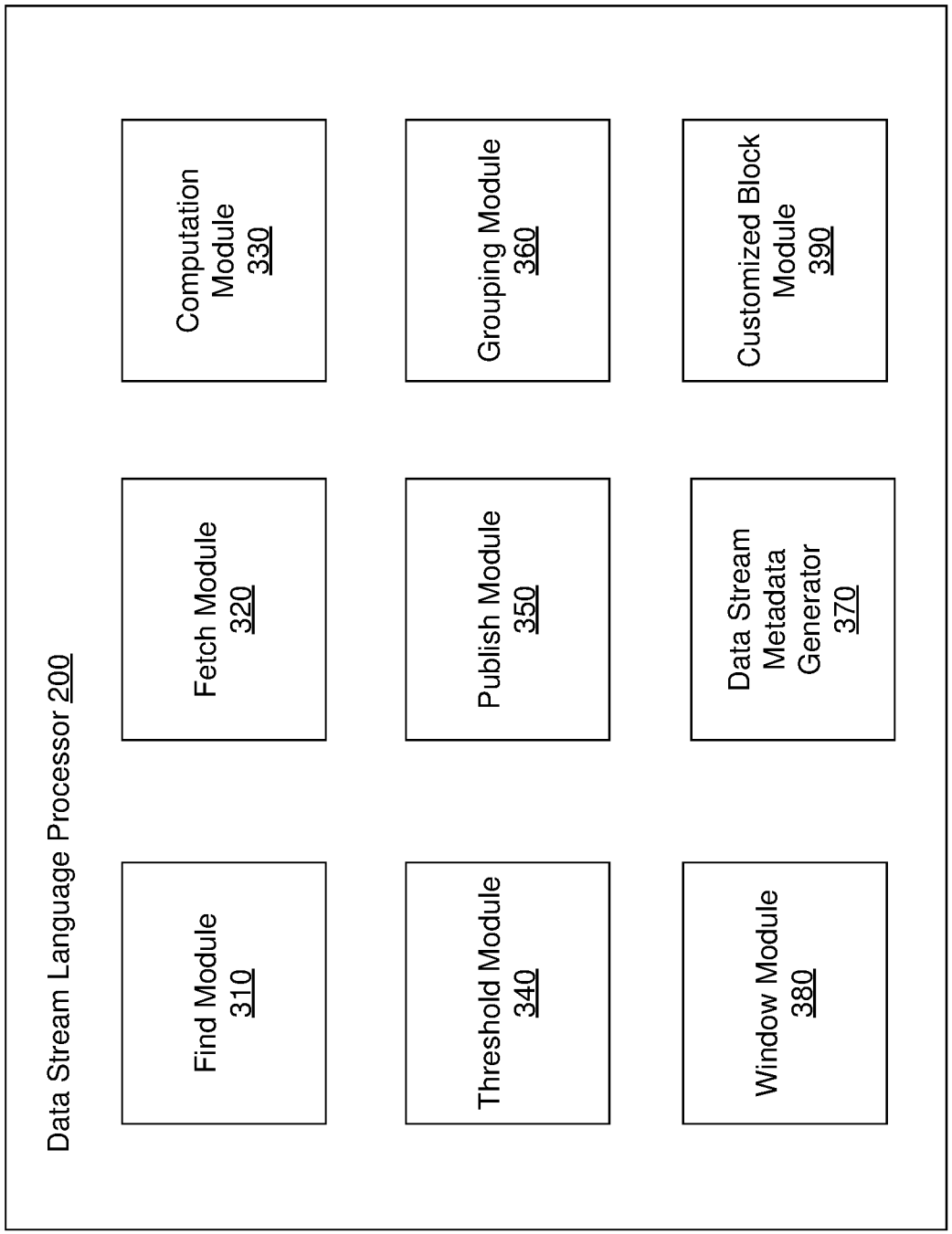
FIG. 3 shows the architecture the data stream language processor for processing blocks of data stream language programs, according to an embodiment.

FIG. 3 shows the architecture the data stream language processor for processing blocks of data stream language programs, according to an embodiment. As shown in FIG. 3, the data stream language processor 200 includes modules for processing various types of blocks of the data stream language. Accordingly, the data stream language processor 200 includes a find module 310, a fetch module 320, a computation module 330, a threshold module 340, a publish module 350, a grouping module 360, a window module 380, a data stream metadata generator 370, and a customized block module 390. Other embodiments may include more or less modules than those shown in FIG. 3. Certain modules are not illustrated in FIG. 3, for example, a parser. The details of each module are further described herein along with details of the types of blocks processed by each module.

The find module 310 executes the find block to identify a set of data streams for processing by the rest of the data stream language program. The fetch module 320 fetches data from the identified data streams and provides the data for processing by subsequent blocks of the data stream language program. The computation module 330 performs statistical computations specified in the data stream language program, for example, mean, median, sum, and so on. The threshold module 340 compares data of an incoming data stream with a threshold value to determine if the incoming data exceeds certain bounds. The threshold value specified for comparison may dynamically change, for example, a threshold value may be specified as a one hour moving average of the input data stream scaled by certain factor. The publish module 350 executes the publish block that provides the output of the blocks preceding the publish block to various receivers including a user interface (e.g., a dashboard) for presenting the results, for storing in a database, or for providing to other blocks for further processing. The grouping module 360 performs grouping of data of input data streams to generate a set of result data streams corresponding to each group. The groups may be based on one or more attributes specified with the grouping command, for example, groups of data streams from each data center. The data stream metadata generator 370 generates metadata representing result data streams generated as a result of executing data stream language programs and stores the metadata in the metadata store 230 for allowing other components of the instrumentation analysis system 100 to use the result data stream. The customized block module 390 processes user defined blocks (customized blocks) in a data stream language program.

Example Data Stream Language Program

Figure 4:
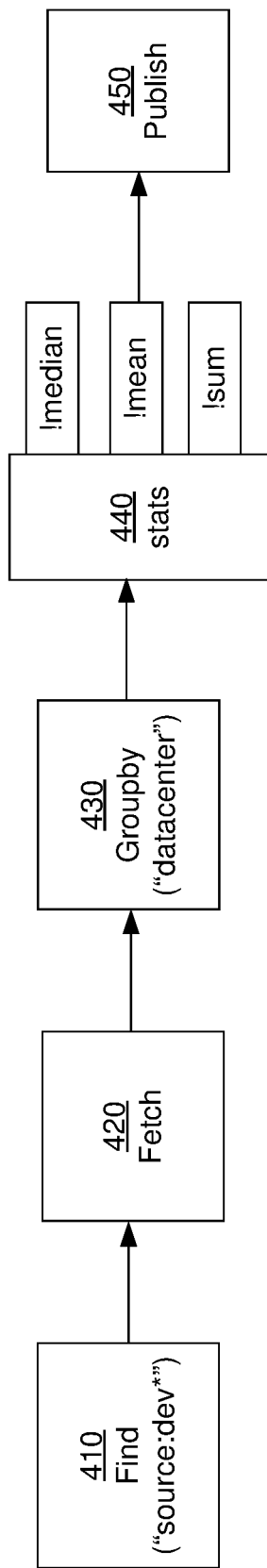
FIG. 4 shows an example of a data stream language program for illustrating features of the data stream language, according to an embodiment.

FIG. 4 shows an example of a data stream language program for illustrating features of the data stream language, according to an embodiment. FIG. 4 represents the data stream language program in terms of blocks. The data stream language program shown in FIG. 4 can be specified as follows.

find("source:analytics*")→fetch
 →groupby("datacenter")
 →stats!mean
 →publish

The first block of the above data stream language program is a find block 410 that takes a string parameter that specifies a search expression. The find block finds a set of data streams received by the instrumentation analysis system 100 that satisfy the search expression. For example, the find block 410 takes search expression "source:dev" that identifies all data stream that the "source" metadata attribute value "dev." For example, an enterprise may associated all development systems with source value "dev." The output of the find block is provides as input to a fetch block 420.

The fetch block 420 retrieves data from the data streams identified by the find block. The fetch block receives data at a pre-specified periodicity. The fetch block may receive real time data of data streams received by the interface module 210 and quantized by the quantization module 240. The fetch block 420 may also receive data of data streams stored in the time series data store 260. The output of the fetch block 420 is provided as input to the groupby block 430.

The groupby block 430 takes names of one or more attributes of data streams as input. The groupby block 430 groups the data streams by the specified attributes. As shown in the example above, the groupby block 430 takes a "datacenter" attribute as input and groups the data streams by their datacenter value. Accordingly, data of all data streams having the same data center is grouped together. The groupby block 430 outputs a data stream corresponding to each value of data center. The output of the groupby block 430 is provided as input to the stats block 440 (which is a type of statistical computation block).

The stats block 440 has multiple outputs, for example, mean, median, sum, and so on. Each output port provides values based on the type of computation specified by the name of the output. The stats block 440 computes the mean value for each group of data streams received as input from the groupby block 430. Accordingly, the stats block 440 determines the mean of data received from data streams of each datacenter. As shown in FIG. 4, the mean output port of the stats block provides input to the publish block 450.

The publish block 450 may be configured to publish the received input on a dashboard. The publish block may be configured to publish the data on the software bus 290. The software bus 290 provides the data to all other modules of the instrumentation analysis system 100. The data stream language processor 200 executes the various blocks specified above at a periodicity specified for the data stream language program.

Overall Process of Execution of a Data Stream Language Program

Figure 5:
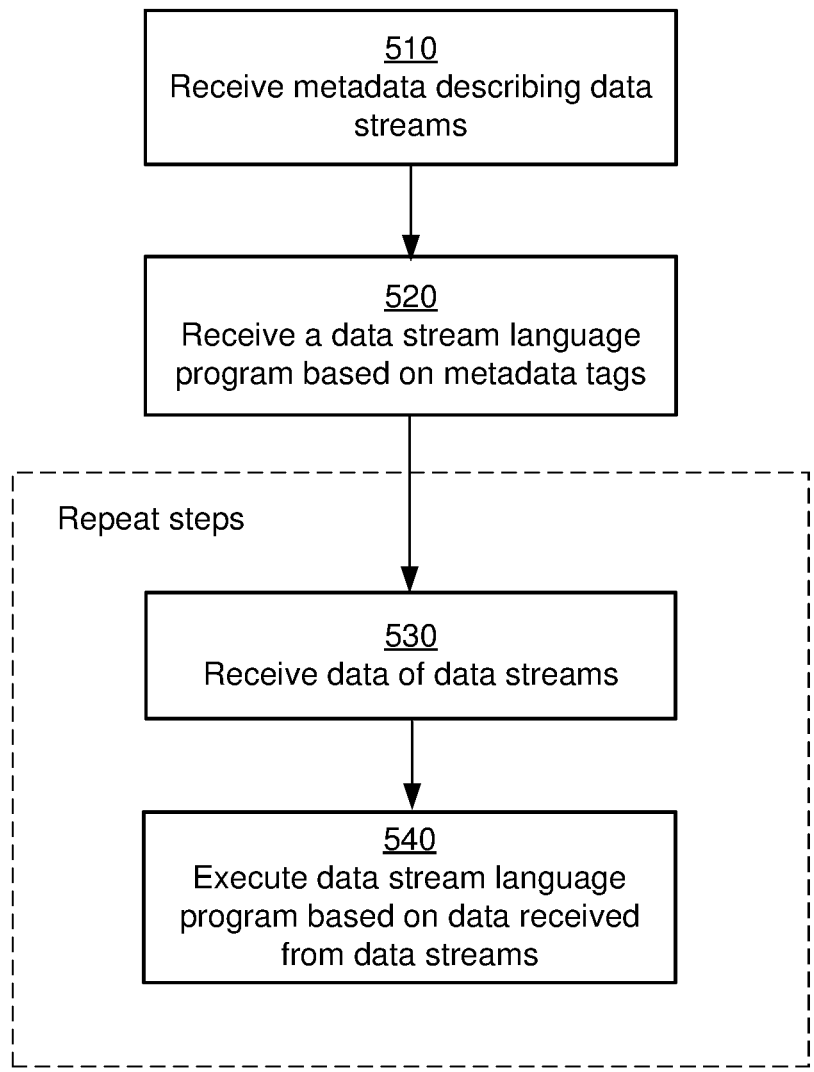
FIG. 5 shows the overall process of an instrumentation analysis system for processing data received from data streams based on a data stream language program, according to an embodiment.

FIG. 5 shows the overall process of an instrumentation analysis system for processing data received from data streams based on a data stream language program, according to an embodiment. The metadata module 220 receives 510 metadata describing data streams. The metadata definition is received independent of the data of the data streams themselves. For example, the data stream may simply provide tuples comprising a data value and a timestamp associated with the data value without providing any properties (for example, name-value pairs). The metadata module 220 receives the properties describing the data streams from a source different from the source providing the data stream. For example, the data streams are provided by instances of instrumented software that is executing on development system 120, whereas the metadata definition may be provided by a system administrator via the administration system 160.

The analytics engine 270 receives 520 a data stream language program using the metadata attributes describing data streams. The data stream language program may represent a set of instructions provided to the instrumentation analysis system 100 to generate reports describing the instrumented software and provide the results in real-time, i.e., as the data of the data streams is received.

The instrumentation analysis system 100 repeats the following steps as data of various data streams is received by the instrumentation analysis system 100 from various development systems 120. The interface module 210 receives 530 data of different data streams. In an embodiment, the interface module 210 waits for a fixed interval of time, for example, 1 second or a few seconds and collects data received from different data streams. In an embodiment, the quantization module 240 performs quantization of the data for each incoming data stream for each time interval. Accordingly, data from each data stream is aggregated into a single value associated with the data stream for that time interval.

The analytics engine 270 executes 540 the data stream language program based on the data of the data streams for the time interval. If the data is quantized for each data stream, the analytics engine 270 executes 540 the data stream language program using the quantized values from each data stream. The data stream language program may include a publish block that causes the analytics engine 270 to send the result(s) of evaluation of the data stream language program for presentation, for example, to a user interface.

The data stream language program may generate one or more data streams. The analytics engine 270 also stores the data streams generated as a result of evaluation of the data stream language program, for example, in the time series data store 260. The analytics engine 270 creates one or more new data streams (or time series) representing the results of the data stream language program. The new data streams are stored in the time series data store 260. This allows the result of the data stream language program to be used as input to other data stream language program. For example, a data stream language program may generate data representing the $95^{th}$ percentile of values received from a plurality of data streams. The result of the data stream language program may be stored in the time series data store 260 as a new data stream. The analytics engine 270 may further execute another data stream language program that computes a moving average value based on the generated data stream.

Quantization

The quantization of the input data streams simplifies processing of data using the quantized data streams. For example, aggregate values based on multiple data streams received can be determined for each time interval. This is performed by further aggregating data for a particular time interval across multiple data streams. In an embodiment, the quantization of an input data stream is performed at the end of each time interval so that the quantized data for the time interval is available for processing.

Furthermore, the instrumentation analysis system 100 stores the quantized data for individual data streams so that data across multiple data streams can be combined in various ways, for example, as specified in a request. In other words, a user may send a first request that combines data across a plurality of data streams in a first manner. Subsequently the user may send a new request for combining the data across different data streams in a different manner. For example, a user may combine data across data streams to view aggregates computed over various data centers. However, subsequently the user may change the request to view aggregates computed over different types of applications, different types of servers, different geographical regions, and so on.

The instrumentation analysis system 100 may also receive a request in which the user modifies the set of data streams over which previous data streams were aggregated. For example, the user may request the instrumentation analysis system 100 to remove one or more data streams from the set of data streams being aggregated and request an aggregate based on the revised set. A user may send such a request to analyze the impact of removing or adding a new server, application, or making any other modification to the system configuration. The instrumentation analysis system 100 keeps the quantized data stream's data and combines the quantized data streams data for different time intervals based on these requests. Since the instrumentation analysis system 100 stores the quantized data streams data, the instrumentation analysis system 100 has the ability to efficiently combine data across data streams as needed.

The instrumentation analysis system 100 can combine data across data streams to perform moving aggregate calculations across multiple data streams. The instrumentation analysis system 100 may continuously compute any moving aggregate value across a given length of time interval, for example, one hour moving average, a 15 minute moving average, and so on.

The quantization module 240 aggregates the values of the input data streams for each time interval and generates an aggregate value for the time interval. Accordingly, the quantization module 240 receives a data stream in which data values can occur after arbitrary time intervals. The quantization module 240 processes the input data stream to generate a data stream in which the data is available at regular time intervals. The details of the quantization module 240 are further described herein.

The quantization module 240 receives information describing the type of value received in the data streams, for example, whether the value is a count of certain action or entities, whether the value was obtained by an aggregation of certain value, whether the value represents a maximum/minimum value of a given set of values, and so on. The type of value of the data stream describes the types of operations performed to obtain the value. The quantization module 240 stores a mapping from the various types of values of the data stream to the type of operation performed on the input values of the data stream for an interval to obtain the result value representing the time interval.

In an embodiment, the quantization module 240 includes a buffer for storing data values that are received as input for a particular time interval. The buffer of the quantization module 240 uses a data structure that can store arbitrary number of values since the number of values received in a time interval is not known in advance and can change from one time interval to another. For example, the quantization module 240 may use a list data structure or a stack data structure for storing the values of the input data stream.

The quantization module 240 collects the data values of the data stream received for each time interval. The quantization module 240 tracks the time. When the quantization module 240 determines that the end of the current time interval is reached, the quantization module 240 processes all the data values received in the time interval to determine the aggregate value representing the time interval. The quantization module 240 subsequently clears the buffer used for representing the input values and uses it to store the values for next time interval. In an embodiment, the quantization module 240 uses multiple buffers so that while the data of a previous time interval stored in a buffer is being processed, new data for the next time interval can be stored in another buffer.

Figure 6:
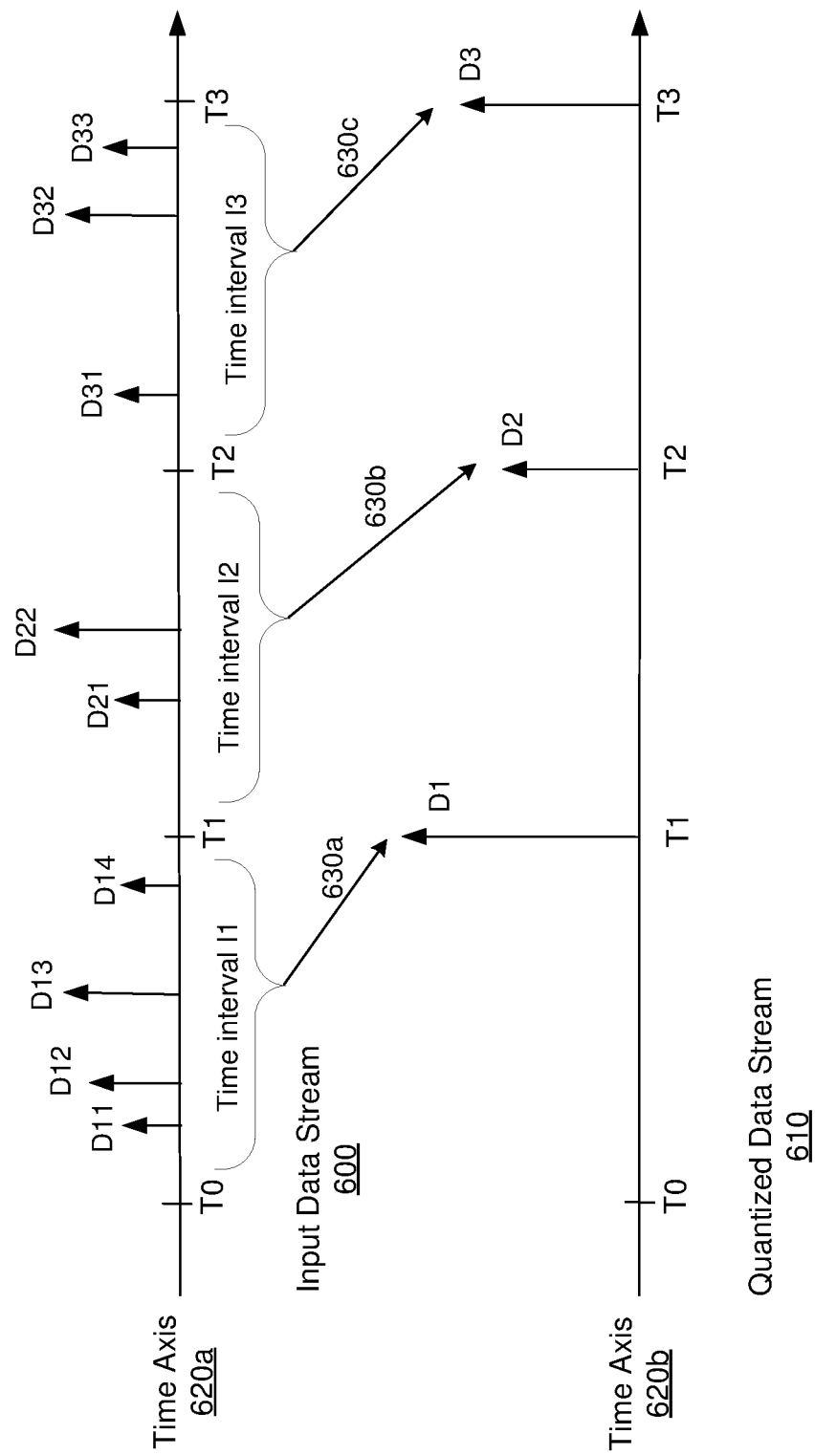
FIG. 6 illustrates the process of quantization of the data streams received from instrumented software, according to an embodiment.

FIG. 6 illustrates the process of quantization of the data streams received from instrumented software, according to an embodiment. FIG. 6 shows time axes 620a and 620b, each representing a time line with series of data values. The time axis 620a shows the data values of the input data stream 600 and time axis 620b shows the values of the quantized data stream 610 generated by the quantization module 240.

As shown in FIG. 6, four data values D11, D12, D13, and D14 are received in the time interval I1 (representing the time from T0 to T1); two data values D21 and D22 are received in the time interval I2 (representing the time from T1 to T2); and three data values D31, D32, and D33 are received in the time interval I3 (representing the time from T2 to T3). Each time interval between Tm and Tn may be assumed to include the start time point Tm (such that the end time point Tn is included in the next time interval). Any other interpretation of the time interval between Tm and Tn may be used, for example, the end time point Tn included in the time interval and the start time point Tm included in the previous time interval.

The quantization module 240 processes the data values of each time interval to generate the corresponding result value shown in the time axis 620b. For example, the quantization module 240 aggregates the values D11, D12, D13, and D14 received in the time interval I1 to generate the value D1 shown in time axis 620b; the quantization module 240 aggregates the values D21 and D22 received in the time interval I2 to generate the value D2 shown in time axis 620b; and the quantization module 240 aggregates the values D31, D32, and D33 received in the time interval I3 to generate the value D3 shown in time axis 620b.

The type of operation performed to aggregate the input values of the data streams depends on the type of data represented by the input data streams. If each tuple of the input data stream is a count of certain value, for example, a count of actions performed by the software, the quantization module 240 aggregates the input values to determine the output data stream value for each time interval by adding the counts. If each tuple of the input data stream received is a minimum (or maximum) of a set of values, the quantization module 240 aggregates the input values for a time interval to determine the output value for that time interval by determining the minimum (or maximum) of the input values for the time interval. If each tuple of the input data stream received is an average of a set of values, the quantization module 240 aggregates the input values associated with the time interval to determine the output data stream value for each time interval by determining an average of the input values of the time interval. If each tuple of the input data stream received is the last available value of the metric at that point in time, the quantization module 240 aggregates the input values for the time interval to determine the output value for that time interval by simply using the last value of the data stream.

Metric Data Streams and Event Data Streams

In an embodiment, the instrumentation analysis system 100 supports two types of data streams, metric data streams and event data streams. An event typically refers to an exceptional condition that occurs in a system, for example, load exceeding certain threshold values or memory usage exceeding certain threshold values. An event may also refer to particular actions performed in a system, for example, by a system administrator of a development system 120. A metric data stream comprises data representing values of metrics that may be obtained from instrumented software or derived from metric data streams obtained from instrumented software. A data stream referred to herein is a metric data stream unless indicated otherwise. A metric data stream is also referred to as a metric time series and an event data stream is also referred to as an event time series.

A metric data stream comprises data points represented using: a data stream identifier, a time stamp value, and a data value. The data stream identifier identifies the data stream to which the data point belongs. The time stamp value associates data point with a time, for example, the time at which the data point was reported or the time at which the data point was received by the instrumentation analysis system 100. The data value is the value of the metric being reported, for example, the value representing the CPU load in a server at a particular time, or a measure of memory usage in a server at a particular time. A metric time series typically provides a large amount of data to the instrumentation analysis system, for example, each data stream may report several data points each second and there may be a large number of data streams for each enterprise.

An event data stream comprises data points represented using: a data stream identifier, a timestamp value, and one or more key value pairs describing an event. The data stream identifier and the timestamp values of an event data stream are similar to the metric data stream. However, events typically occur with less frequency compared to data points of metric data stream. For example, an event may represent an action performed by a system administrator, such as starting a maintenance window. The key value pairs of the event describe the event, for example, the name of the system administrator that started the maintenance window, the purpose of the maintenance window, the scope of the maintenance window and so on. Events typically occur at an irregular rate, for example, events may be reported by some system but not others, events may occur once and may not occur for significant amount of time, and so on. As a result, the amount of information stored with events can be large.

An event may also describe certain specific conditions occurring in a system, for example, certain metrics displaying certain characteristic. As an example, an event may be reported if the cpu load or memory usage of a server exceeds certain threshold values. These events are generated by the instrumentation analysis system 100 as a result of execution of data stream language programs.

The instrumentation analysis system 100 treats event time series the same way as metric time series in terms of processing the data. For example, the instrumentation analysis system 100 allows real time reporting of information based on either type of data streams. The instrumentation analysis system 100 allows an event data stream to be compared with a metric data stream to allow a user to correlate the two. For example, a report may be generated that overlays a metric data stream with an event data stream indicating the metric values when the event was generated.

Dynamic Selection of Data Streams for a Data Stream Language Program

The find block allows dynamic selection of data streams is input for a data stream language program. The find block specifies a search condition for identifying data streams. In an embodiment, the search condition is an expression based on attributes (or metadata tags) describing data streams. These attributes may be received as part of the data stream or associated with the data stream, for example, as metadata added to the instrumentation analysis system 100 and stored in the metadata store 230. The data streams identified by executing the search condition are provided as input to the subsequent block of the data stream language program.

The data stream language processor 200 may evaluate the search condition of the find block periodically, thereby reevaluating the set of data streams provided as input to the data stream language program. As a result, the set of data streams provided as input to the data stream language program is dynamically changed. For example, a development system 120 may add new servers, start or stop services, or reconfigure existing services. Furthermore, new development system 120 may send data streams to the instrumentation analysis system 100. As a result, the set of data streams received by the instrumentation analysis system 100 changes dynamically.

The search condition of the find block may be used to identify a set of data streams based on characteristics of the data stream. For example, search conditions may be used to identify services belonging to a particular data center, services corresponding to a particular application, services associated with an organization that may be spread across multiple data centers, services running a particular version of a software (say operating system, or an application having certain patch). The type of search conditions specified for a find block depends on the type of metadata tags defined for the data streams and stored in the metadata store 230.

The search condition of a find block is evaluated over all data streams received from external systems such as development systems as well as data streams generated within the instrumentation analysis system 100, for example, as intermediate or final results of data stream language programs. For example, as described herein, intermediate or final results of data stream language programs are represented as first class citizens that are treated the same as data streams received from development systems 120. Accordingly, when the search condition of a find block is evaluated, the result may include data streams received from developments systems 120 as well as data streams internally generated within the instrumentation analysis system 100.

Following are a few examples of search conditions specified for find blocks. Assume that a user wants to find load on analytics servers and the analytics servers are named analytic1, analytic2, analytic3, . . . , and analyticN. The set of analytics servers can be identified by using a find block find("source:analytic*") that specifies the search condition as all data streams with metadata tag value satisfying the regular expression "analytic*".

The search condition may be a logical expression. For example, the find block find("source:databank* AND metric:numCacheHits") finds all data streams having source attribute of the form "databank*" and the metric name numCacheHits. Accordingly, the data stream language program with this find block is evaluated for all data streams providing the metric numCacheHits from sources identified as "databank*". Similarly, the find block find("source:databank* AND metric:numCacheMisses") finds all data streams providing the metric numCacheMisses from sources identified as "databank*". As another example, the find block find("source:zk* AND smetric:cpu AND region:ore1") finds all data streams having source name of the form "zk*" from region "ore1" having metric "cpu".

The find block may be associated with configuration parameters specifying one or more of a start time, a stop time, and a periodicity. The periodicity of the find block may be different from the periodicity of job of the data stream language program to which the find block belongs. This is so because the rate at which the set of data streams may be the different from the rate at which the user would like the data to move through the data stream language program. For example, a user may determine that the set of data streams doesn't change often and the search string may be evaluated once every hour or so whereas the periodicity of the job is 1 minute. Accordingly, the user may specify different values of periodicity for the find block and the data stream language program.

In an embodiment, the evaluation of the find block is not based on a fixed periodicity but triggered by certain events that occur in the instrumentation analysis system 100. For example, the evaluation of the find block is triggered by any update in the metadata. An update in the metadata may cause the result of the find block to change, resulting in a different set of input data streams being processed by the data stream language program based on the find block. In an embodiment, the instrumentation analysis system 100 associates a find block with specific portions of metadata. In an embodiment, if the find block is based on certain metadata attributes, any change associated with those metadata attributes triggers the execution of the find block. For example, if the find block evaluates to true for all data streams from region "xyz", the evaluation of data streams is triggered by any addition or deletion of data streams to the region "xyz." The addition or deletion of data streams to other regions may not trigger the execution of the find block. The instrumentation analysis system 100 analyzes and identifies sets of metadata attributes associated with each find block. The instrumentation analysis system 100 detects if a change in metadata occurs that is associated with the set of metadata attributes associated with a find block. If the instrumentation analysis system 100 detects that a change in metadata has occurred that is associated with the set of metadata attributes associated with a find block, the instrumentation analysis system 100 reevaluates the find block. In an embodiment, the instrumentation analysis system 100 re-evaluates the find block if it detects that properties associated with a data stream have changed. In an embodiment, the find block is re-evaluated if the definition of find-block is modified.

In an embodiment, the find blocks are re-evaluated when there are changes in data streams. For example, if new data streams are detected by the instrumentation analysis system 100 or if the instrumentation analysis system 100 determines that a data stream is inactive, the instrumentation analysis system 100 re-evaluates the find block. The data streams generated may be data streams received from external systems such as development systems 120 or the data streams may be generated by an intermediate or final result of data stream language program. For example, as described herein, intermediate or final results of data stream language programs are represented as first class citizens that are treated the same as data streams received from development systems 120. Accordingly, addition, deletion, or modification of metadata of these data streams also causes the find block to be re-evaluated.

Figure 7:
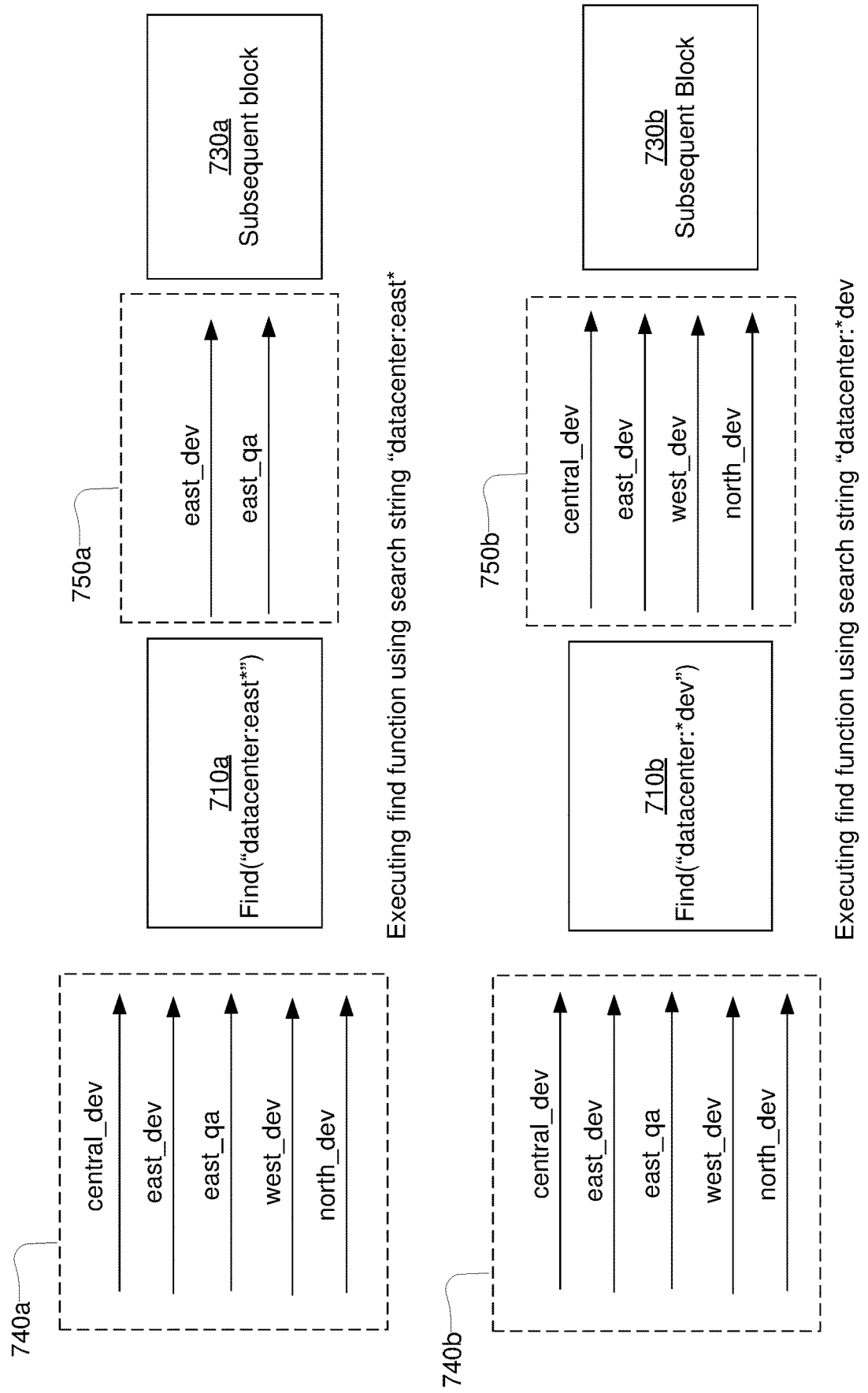
FIG. 7 illustrates selection of a set of data streams by a find block for providing input to a data stream language program, according to an embodiment.

FIG. 7 illustrates selection of a set of data streams by a find block for providing input to a data stream language program, according to an embodiment. As shown in FIG. 7, the find block 710a has a search condition specified by search string "datacenter:east*." The find module 310 of the data stream language processor 200 identifies all data streams for which the "datacenter" metadata tag (or attribute) satisfies the regular expression "east*".

FIG. 7 shows a set 740a of data streams received by the instrumentation analysis system 100 including data streams having datacenter tag values central_dev, east_dev, east_qa, west_dev, and north_dev. The find module 310 determines that the data streams with data center tag values east_dev and east_qa satisfy the search condition of the find block 710a. The find module 310 provides the set of identified data streams 750a for the subsequent block 730a of the data stream language program.

The set of data streams provided as input to the rest of the data stream language program depends on the search condition associated with the find block 710. For example, the find block 710b has search condition "datacenter:*dev" which is different from the search condition of the find block 710a. The find module 310 of the data stream language processor 200 processes the search condition of the find block 710b by identifying all data streams for which the "datacenter" metadata tag (or attribute) satisfies the regular expression "*dev".

FIG. 7 shows a set 740b of data streams received by the instrumentation analysis system 100 including data streams having datacenter tag values central_dev, east_dev, east_qa, west_dev, and north_dev. In this example, set 740b has elements same as set 740a. The find module 310 determines that the data streams with data center tag values central_dev, east_dev, west_dev, and north_dev satisfy the search condition of the find block. The find module 310 provides the set of identified data streams 750b for the subsequent block 730b of the data stream language program.

FIG. 7 illustrates dynamically determining the set of data streams processed by a data stream language program by the data stream language processor 200. The set of data streams processed by the data stream language is determined based on the search condition of the find block 710 and the currently available data streams received by the instrumentation analysis system 100.

In an embodiment, the find block is associated with a schedule such that the find module 310 of the data stream language processor 200 executes the find block according to the schedule. For example, the find block may be associated with a periodicity such that the find module 310 executes the find block at a rate determined based on the periodicity. Accordingly, the find module 310 waits for a time interval based on the periodicity and reevaluates the set of data streams satisfying the search condition of the find block. This process is repeated (until the time reaches an "end time" value associated with the find block).

Figure 8:
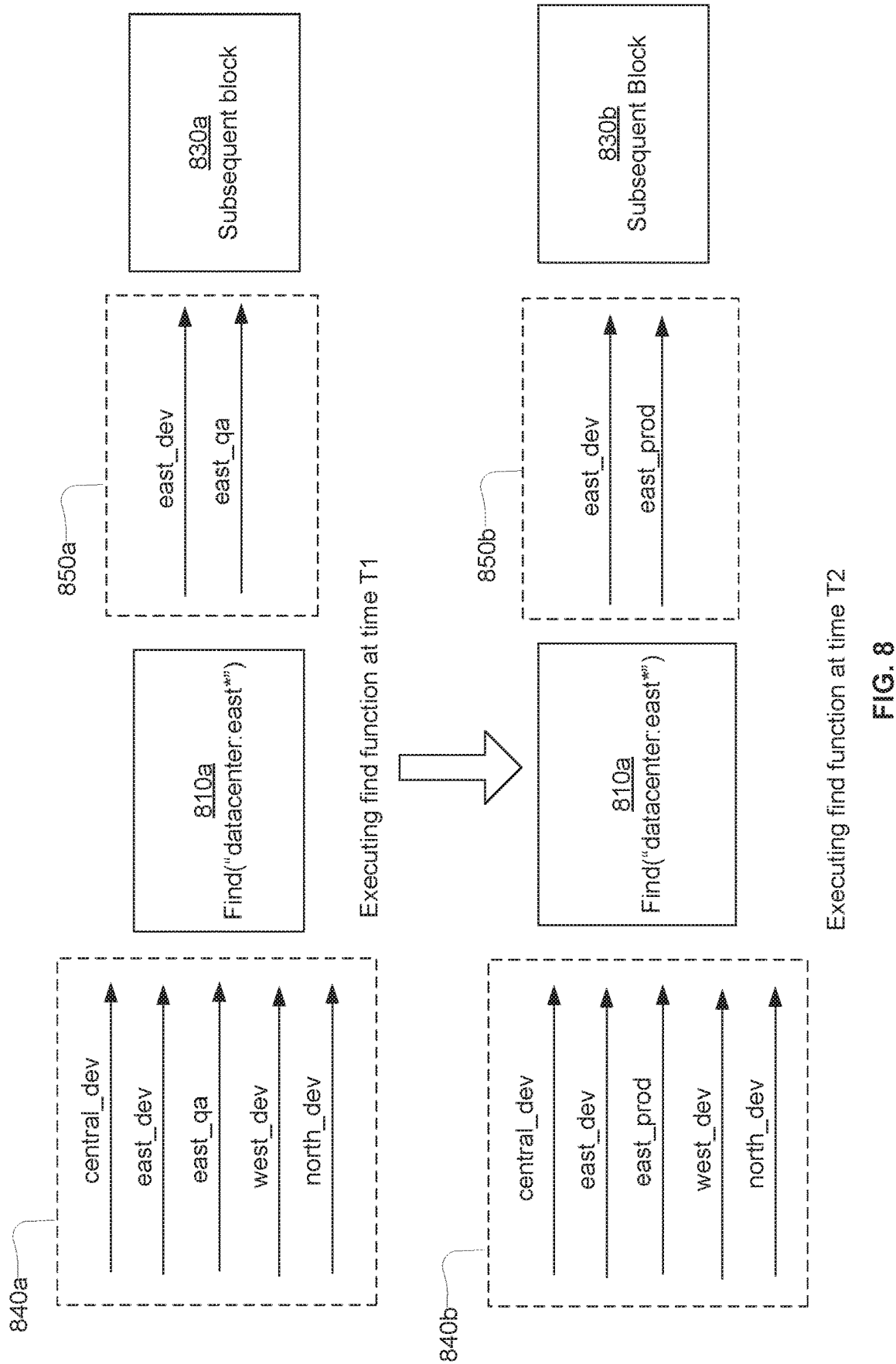
FIG. 8 illustrates dynamic changes to the set of data streams providing input to a data stream language program as a result of periodic re-evaluation of the find block, according to an embodiment.

FIG. 8 illustrates dynamic changes to the set of data streams providing input to a data stream language program as a result of periodic re-evaluation of the find block, according to an embodiment. As shown in FIG. 8, the search condition of the find block is evaluated at time T1 and again at time T2 resulting in different sets 850 of data streams being identified for processing by the data stream language program. FIG. 8 illustrates re-executing the find block at two different time points.

At time T1, the instrumentation analysis system 100 receives a set 840a of data streams with datacenter tag values central_dev, east_dev, east_qa, west_dev, and north_dev (note that there may be multiple data streams with the same datacenter tag values). The find module 310 evaluates the find block 810a with search condition "datacenter:east*". Accordingly, the find module 310 identifies a set 850a of data streams with datacenter tag values east_dev and east_qa. The data stream language processor 200 provides the set 850a of data streams identified to the subsequent block 830a of the data stream language program.

The find module 310 re-evaluates the find block at time T2. At time T2, the instrumentation analysis system 100 receives a set 840a of data streams with datacenter tag values central_dev, east_dev, east_prod, west_dev, and north_dev. Accordingly, the find module 310 identifies set 850b of data streams with datacenter tag values east_prod and east_qa.

Compared to the set 850a identified at time T1, the set 850b includes a new data stream with datacenter tag east_prod and lacks the data stream with datacenter tag east_qa. The data stream language processor 200 provides the set 850a of data streams identified to the subsequent block 830a of the data stream language program. Accordingly, each subsequent evaluation of the set 850 of data streams based on the same search condition of the find module may result in a different set of data streams being provided to the subsequent blocks 830.

The ability to dynamically change the set of data streams that are processed by a data stream language program allows the data stream language program to adapt to a dynamically changing environment that provides input to the instrumentation analysis system. For example, an enterprise may add/remove servers to a data center, add new data centers, add/remove/modify services, change services to execute software instrumented in different ways and so on. The ability to specify the set of data streams processed by a data stream language program allows the instrumentation analysis system to report data describing the enterprise as it changes dynamically without having to modify the data stream language program.

Figure 9:
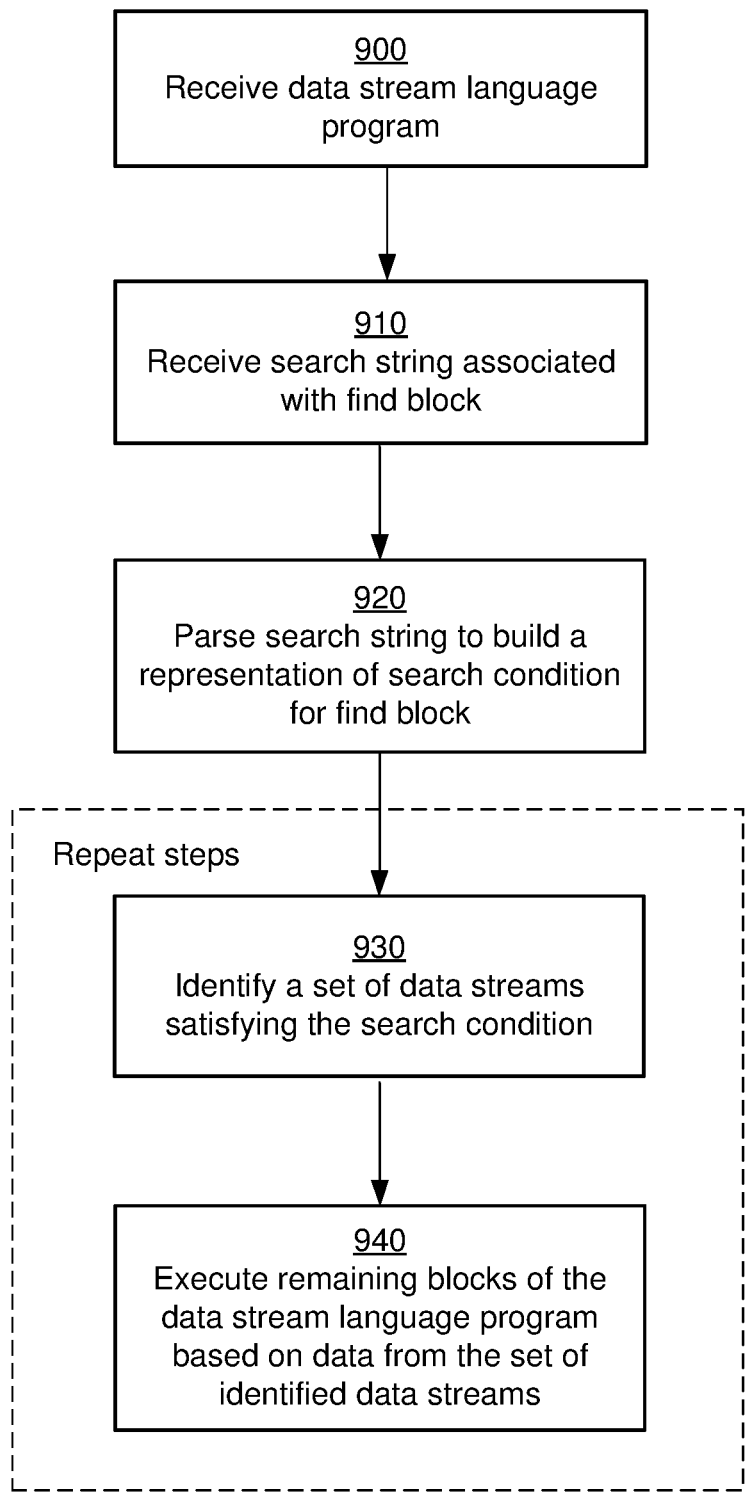
FIG. 9 shows the process for identifying a set of data streams for providing input to a data stream language program using the find block, according to an embodiment.

FIG. 9 shows the process for identifying a set of data streams for providing input to a data stream language program using the find block, according to an embodiment. As shown in FIG. 9, the data stream language processor 200 receives 900 a data stream language program for processing. The process illustrated in FIG. 9 is based on the assumption that the data stream language program has a find block followed by a set of blocks corresponding to the remaining data stream language program.

The find block is associated with a search string. The find module 310 receives 910 the search string associated with the find block. The find module 310 parses 920 the search string to build a representation of the search condition corresponding to the search string, for example, a parse tree representation. The find module 310 identifies 930 a set of data streams corresponding to the search condition. The find module 310 provides the set of identified data streams to the subsequent block of the data stream language program, for example, the fetch block. The data stream language processor 200 retrieves data from the data streams identified 930 based on the search condition and executes 940 the remaining data stream language program.

The steps of identifying 930 the set of data streams based on the search condition and executing 940 the remaining blocks of the data stream language program are repeatedly executed by the data stream language processor 200. The rate at which the steps 930 and 940 are repeated may be different. For example, the step of identifying 930 the set of data streams may be executed at a slower rate compared to the rate at which the remaining blocks of the data stream language program are executed. The rate of execution 940 of the remaining blocks of the data stream language program and the rate of execution of the find block is specified (for example, by a user) for a job corresponding to the data stream language program.

Retrieving Data from Data Streams for a Data Stream Language Program

In an embodiment, a data stream language program includes a fetch block for retrieving data from a given set of data streams. Typically the fetch block is placed after the find block in the data pipeline of the data stream language program. In other words, the output of the find block is provided as input to the fetch block. Accordingly, the fetch block retrieves data from the set of data streams identified by the find module 310 as a result of processing a find block. The fetch module 320 executes the fetch block.

Figure 10:
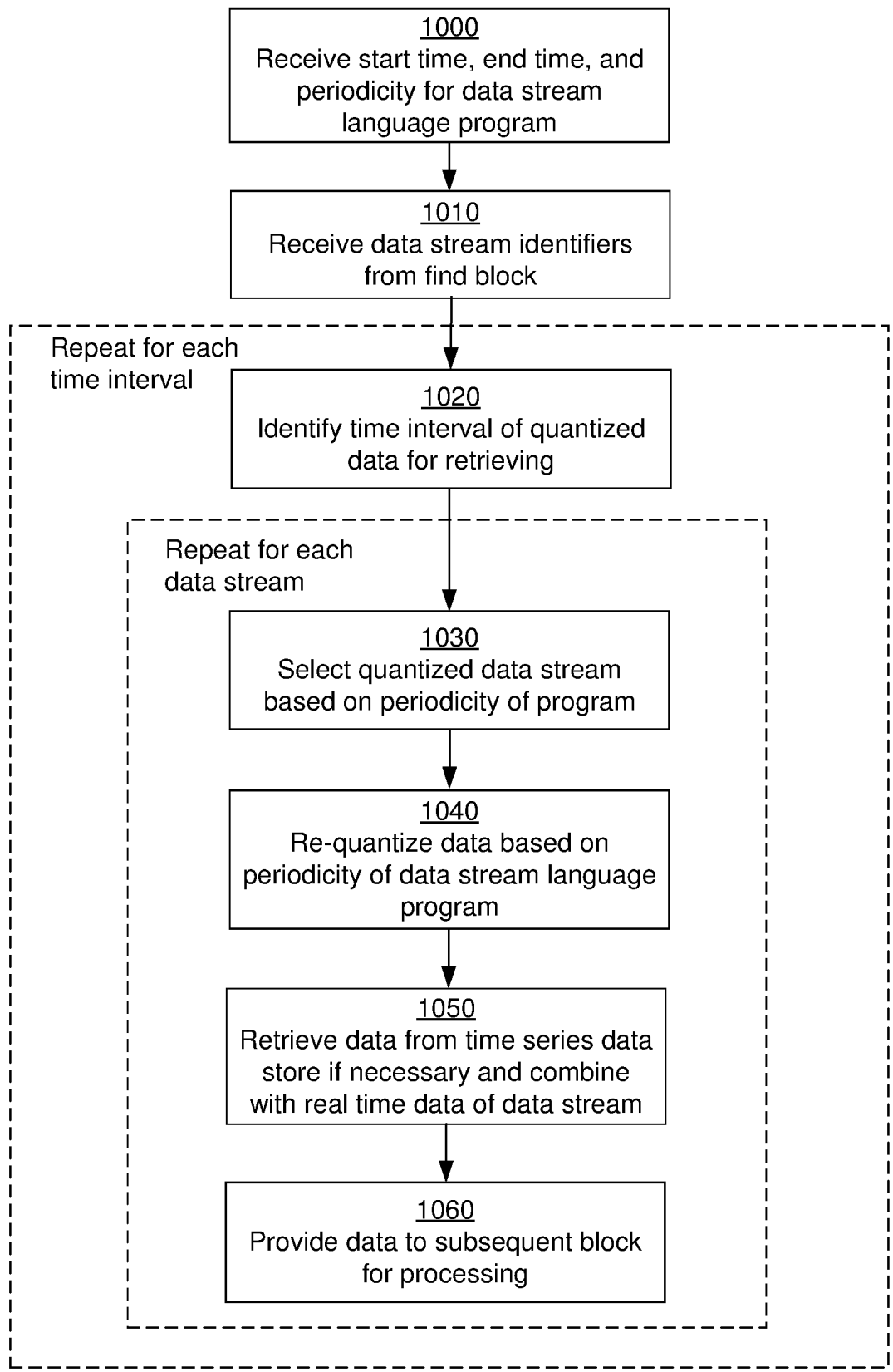
FIG. 10 illustrates the process of retrieving data from data streams by executing a fetch block, according to an embodiment.

FIG. 10 illustrates the process of retrieving data from data streams by executing a fetch block, according to an embodiment. Certain steps indicated in FIG. 10 can be executed in an order different from that indicated in FIG. 10. Furthermore, steps can be executed by modules different from those indicated herein.

The data stream language processor 200 receives the start time, end time, and periodicity of execution of a job based on a data stream language program. The fetch module 320 receives the set of data streams from the find module 310 based on the search condition of the find block of the data stream language program. The fetch module retrieves data and provides it for execution to the subsequent block of the data stream language program. The fetch module 320 performs the following steps for fetching data from data streams for each subsequent time interval.

The fetch module 320 identifies the next time interval and waits for data to arrive during the time interval. The quantization module generates multiple quantized data streams having different periodicity based on data of each input data stream. For example, a quantized data stream Q1 may be generated with a periodicity of 5 second, another quantized data stream Q2 may be generated with a periodicity of 10 second, another quantized data stream Q3 may be generated with a periodicity of one minute, and so on. The fetch module 320 selects 1020 the quantized data stream that has the largest periodic time interval that is smaller than the periodic time interval at which the data stream language program is executed (as determined based on the periodicity of the data stream language program).

For example, if the size of the time interval at which the data stream language program needs to be executed in 30 seconds based on the periodicity of the data stream language program, the fetch module 320 selects the quantized data stream Q2 having the periodicity of 10 seconds. The quantized data stream Q3 is not selected because it has a periodic time interval of 1 minute (i.e., 60 seconds) which is larger than the time periodic time interval of the data stream language program (i.e., 30 seconds). The quantized data stream Q3 is not selected because it has a periodic time interval of 5 seconds which is not the largest periodic time interval that is smaller than the periodic time interval of the data stream language program (since it is smaller than the periodic time interval of Q2 which is 10 seconds). The fetch module 320 re-quantizes the selected quantized data stream to generate a re-quantized data stream of periodicity 30 seconds (for example, by aggregating the data values of three data points of the quantized data stream that occur in the current 30 second time interval).

The fetch module 320 retrieves 1050 data from the time series data store 260 if necessary to combine with the real time data being received from data streams. The fetch module provides 1060 the combined data to the subsequent block, for example, a statistical computation block. For example, assume that a data stream language program publishes output to a screen and the start time of the job is indicated as negative (for example, −1 hour). The data may be presented as a chart that presents data as it is received as well as past data for a selected time interval. For example, a user may select a one hour time window for presenting the data on the chart. In this situation, if the chart was rendered only based on the real time data received in the data streams, the chart would be empty when the instrumentation analysis system 100 starts processing the data stream language program. The displayed chart would slowly start filling from the right and would fill up the displayed window after an hour. This presents a user experience that is not ideal. Ideally a user would like to see the full chart (with one hour of data) throughout the one hour that the chart is displayed from the beginning.

The fetch module 320 remedies the above situation by retrieving 1050 data from the time series data store 260 for rendering the portion of the chart that occurs before the time for which the real time data from the data streams is available. For example, when the instrumentation analysis system 100 starts processing the data stream language program, the fetch module 320 presents the data for rendering the entire chart using the data obtained from the time series data store 260. As more and more data is received from data streams, the fetch module 320 combines the data from the time series data store 260 with the real time data received.

As an example, after 10 minutes, the fetch module 320 sends for presentation 50 minutes of data retrieved from the time series data store 260 combined with 10 minutes of data received from data streams. Similarly, after 30 minutes, the fetch module 320 sends for presentation 30 minutes of data retrieved from the time series data store 260 combined with 30 minutes of data received from data streams, and so on. After more than 60 minutes of data of data streams is received, the fetch module 320 has sufficient data based on data streams that it can send all the data for rendering the chart based on data received from data streams and does not have to combine the data from data stream with previously stored data of the time series data store 260.

The fetch module 320 may retrieve 1050 data from time series data store 260 for combining with data received from data streams in other situations, for example, for a window block. A window block provides a sliding time window of a specified length (say tw) and performs a computation of the data of the window (say average value) to determine a moving average over a one hour time window. In this situation, there is an initialization latency of time tw since the data from the data streams is not available for a period of time tw to fill up the entire window. Accordingly, if the data stream language program starts at time t1, the data starting from time t1−tw is fetched from the time series data store 260 to fill up the window to provide meaningful data for the window computation. At any time t0>t1, (while t0-t1 is less than tw), the fetch module 320 fills up the end portion of the window of length t0-t1 with real time data received from data streams and fills up the first portion (i.e., the remaining portion) of the window with data retrieved from the time series data store 260.

If the data stream language program includes multiple windows computation, the fetch module 320 maintains data of the size of the largest window that needs to be fetched by combining the data from the time series data store 260 (if necessary) and the real time data received from data streams. The data maintained for the largest window includes data for smaller windows.

Figure 11A:
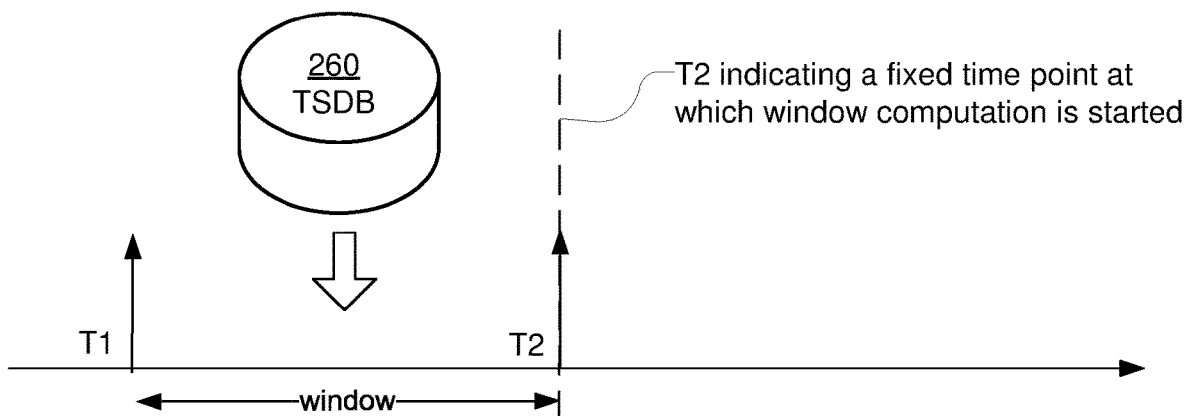
FIGS. 11A-C illustrate the process of combining data from the time series data store and data received in real-time from data streams for moving window calculations, according to an embodiment.
Figure 11B:
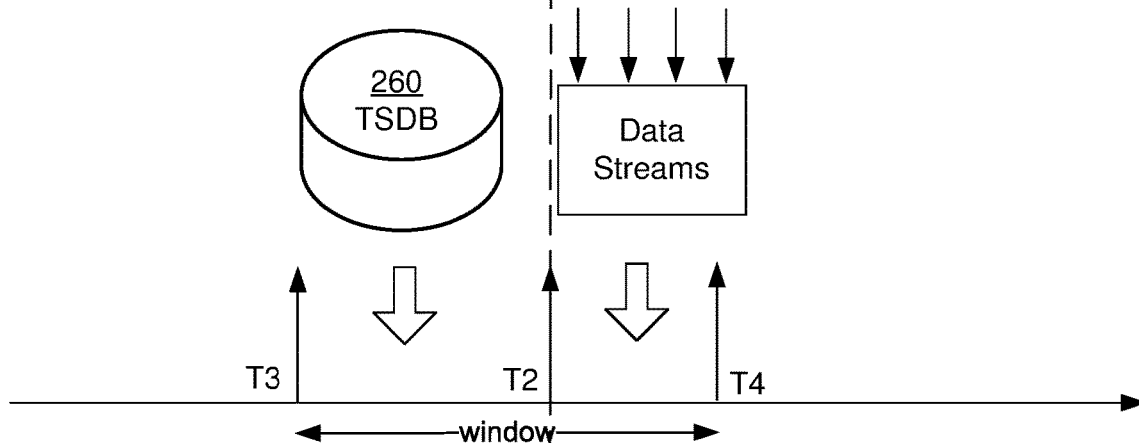
Figure 11C:
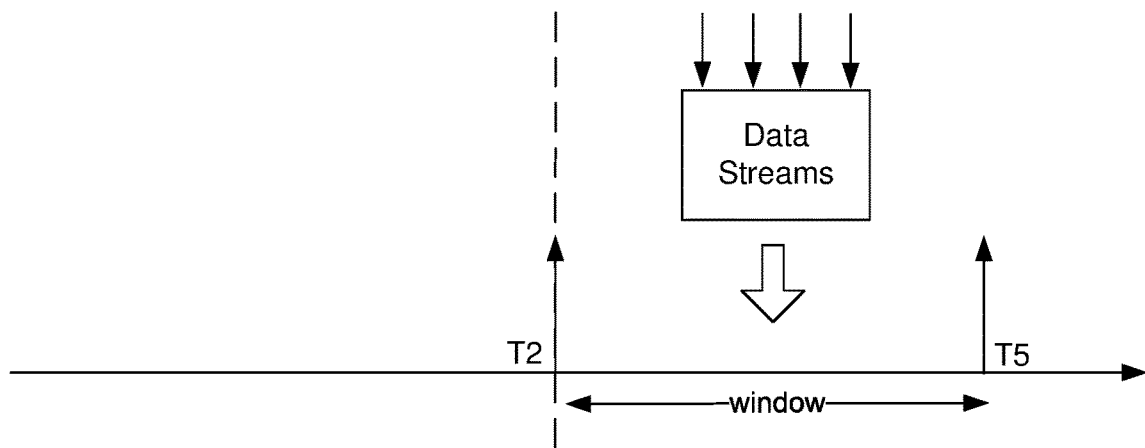

FIGS. 11A-C illustrate the process of combining data from the time series data store and data received in real-time from data streams for moving window calculations, according to an embodiment. The length of the moving window is assumed to be Tw. An example computation is an aggregation across data of a set of data streams, for example, average value or a percentile calculation based on data received during the moving window across the set of data streams. The moving window is a time window that keeps shifting. In other words the size of the moving window stays constant but the window keeps advancing with time.

The number of data points that occur within the window may change over time. The number of data streams processed may also change as the window advances, for example, due to introduction of new data streams or due to modifications to metadata describing the data streams. For example, if the moving window is computing an average value of data across all data streams from data center "east", the number of data streams may change over time if the data center "east" starts/stops services, introduces new servers, or if the metadata describing data streams is modified to add/remove the "datacenter=east" tag to/from certain data streams. The data stream language processor 200 periodically re-evaluates the set of data streams and also the set of data points that occur within the window and computes the aggregate value specified for the data points from the selected data streams.

FIG. 11A shows the scenario in which when a window computation is started, entire data of the window may be retrieved from the time series data store 260. FIG. 11B shows that after some time (which is less than the time Tw, the length of the window), the fetch module 320 combines data from the time series data store 260 with real time data received from data streams. FIG. 11C shows that after a time greater than the length of the window Tw, the fetch module 320 does not have to retrieve data from the time series data store 260 and can fill up the entire window with real time data obtained from the data streams.

As shown in FIG. 11A, T2 indicates the current time and given a window of size Tw, time T1 represents the time point T2-Tw. Assume that the window computation starts at time T2. Accordingly, the window is in time range T1 to T2. There is no data received from data streams at this point. The data for the entire window is retrieved from the time series data store 260.

FIG. 11B shows that after some time, the current time is represented by T4 and the window has advanced to the time range T3 to T4. The real time data is collected and used in the window calculation for the time range T2 to T4 since the real time data was collected since time T2. For the time range T3 to T2, the fetch module 320 still uses data from the time series data store 260. The scenario shown in FIG. 11B applies for all times when the time range T4-T2 is less than Tw (in other words, for all times since T2 that is less than the size of the window).

FIG. 11C shows the scenario for times that are equal to or greater than the length of the window. In other words, if T5 is the current time, FIG. 11C applies for all times T5 such that T5-T2 is greater than or equal to the length of the window Tw. In these scenarios, the fetch module 320 has accumulated enough real-time data from data streams, that the fetch module 320 does not retrieve data from the time series data store 260. In other words, the window computation is performed using all the data received in real time from the data streams.

The scenario described in FIGS. 11A-C also applies for presenting data using a chart (e.g., via a dashboard). The data from the time series data store 260 is used to fill up the initial portion of a chart to avoid showing the chart filling up slowly as time advances. The ability to fill up the chart with data from the time series data store 260 provides for a better user experience since the user is presented with a chart for the entire time window selected by the user.

Grouping Data Streams

Figure 12:
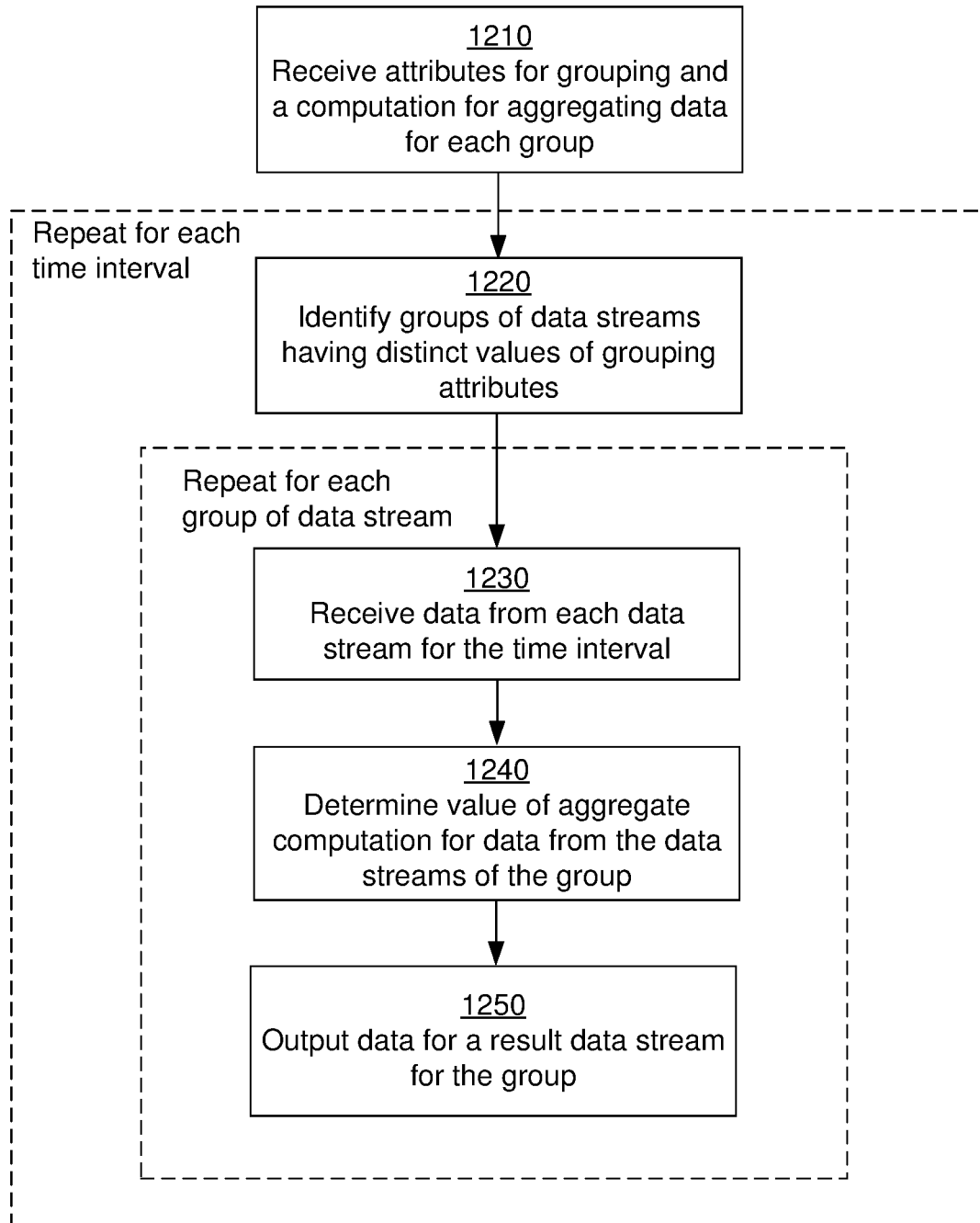
FIG. 12 illustrates a process for grouping data of data streams to generate a set of result data streams, according to an embodiment.

FIG. 12 illustrates a process for grouping data of data streams to generate a set of result data streams, according to an embodiment. A grouping statement may be included in a data stream language program, for example, using the groupby block as shown in FIG. 4. The grouping statement of a data stream language program specifies one or more metadata attributes describing data streams. The groupby block is associated with an aggregate computation that is performed for each group of data streams.

The grouping module 360 receives 1210 one or more attributes describing data streams. The attribute may be attributes received with the data of the data stream (for example, source name, and metric name) or metadata tags associated with the data stream by the metadata module 220 and stored in the metadata store 230. The grouping module 360 also receives a particular computation to be performed for each group of data streams, for example, a computation determining an aggregate value based on data of the data streams.

The data stream language processor 200 (and its component modules) perform the following computation for each time interval based on the periodicity specified for the job executing the data stream language program. The grouping module 360 identifies 1220 groups of data streams corresponding to each distinct set of values of the one or more attributes associated with the grouping command. For example, if the attribute specified with the grouping command is the "datacenter" attribute, the grouping module 360 identifies sets of data streams, each set having a distinct value of the "datacenter" tag.

The grouping module 360 performs the following computations for each set (or group) of data streams identified. The grouping module 360 receives 1230 data corresponding to each data stream of the set for that particular time interval. The grouping module 360 determines 1240 the value of the aggregate computation for the data from data streams of each group. For example, if the grouping is based on attribute "datacenter" and the computation specified is average, the grouping module 360 determines 1240 the average of data of all data streams for a particular datacenter obtained for the given time interval. The grouping module 360 outputs 1250 the result of the computation for each group to the subsequent block of the data stream language program.

As described in the process illustrated in FIG. 12, the grouping statement (i.e., the groupby block) takes a set of data streams as input and generates a set of result data streams. The grouping statement may specify grouping by a plurality of metadata attributes. The number of result data streams generated is equal to the number of distinct attribute values of the grouping attributes for which at least one data stream exists in the input set. In other words, a data stream is generated for each distinct combination of values of the grouping attributes if there are data streams in the input that have attributes with that combination of distinct values.

Figure 13A:
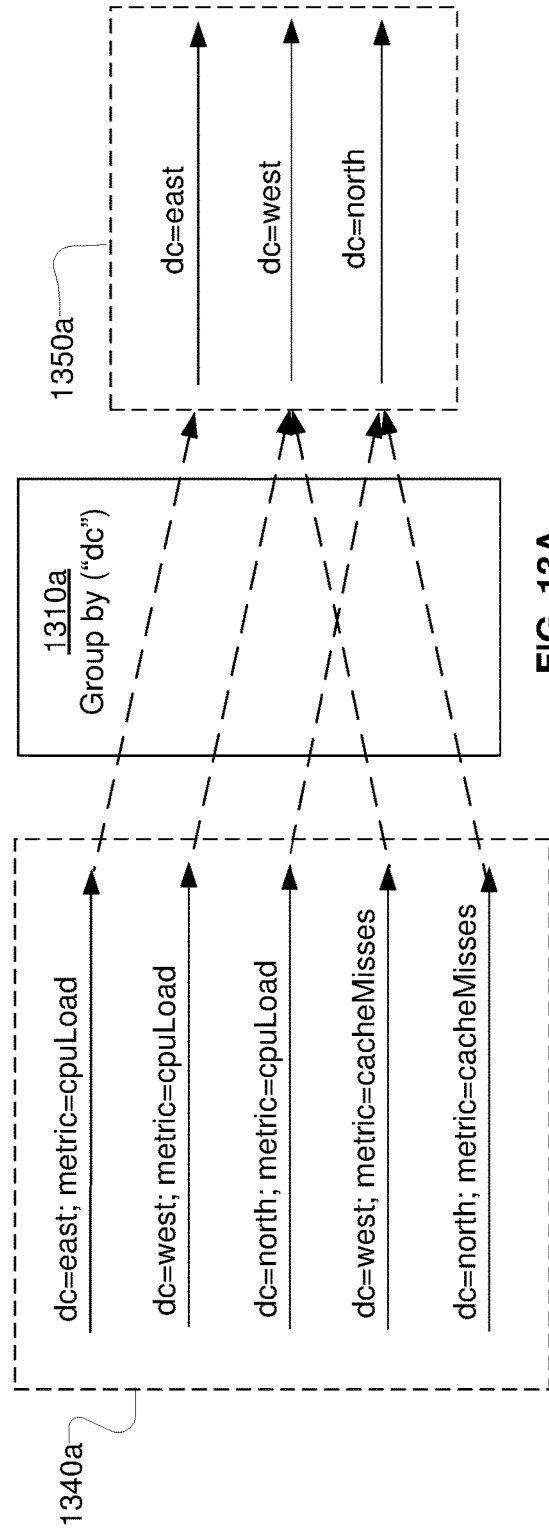
FIGS. 13A-B shows an example scenario illustrating grouping of data streams based on different metadata attributes describing the data streams, according to an embodiment.
Figure 13B:
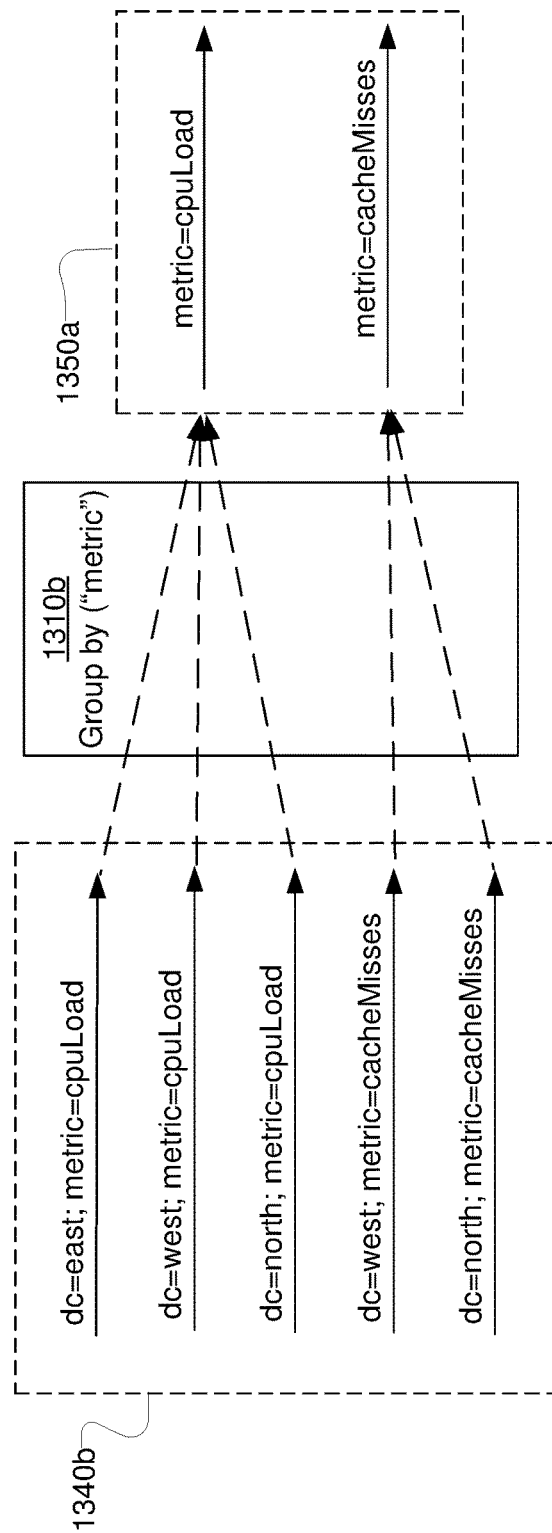

FIGS. 13A-B shows an example scenario illustrating grouping of data streams based on different metadata attributes describing the data streams, according to an embodiment. FIG. 13A shows grouping of a set of data streams based on an attribute "dc" (representing data center). The input set 1340a of data streams includes a data stream with attributes dc=east and metric=cpuLoad, a data stream with dc=west and metric=cpuLoad, a data stream with dc=north and metric=cpuLoad, a data stream with dc=west and metric=cacheMisses, and a data stream with dc=north and metric=cacheMisses. The grouping module 360 processes the grouping block 1310a that specifies groupby("dc") to collect data streams from the input set 1340a having the same attribute value for the attribute dc. The input set 1340a includes one data stream with dc=east, two data streams with dc=west, and two data streams with dc=north.

In an embodiment, grouping module 360 ignores distinct values of the group by attribute if there are no input data streams having that combination of values. Accordingly, the grouping module 360 does not generate any result data stream corresponding to these attribute values. For example, if the dc attribute can have other possible values, say, "north-east", "south-west" and so on, and there are no input data streams having these attribute values, the grouping module 360 does not generate any result data streams corresponding to the these distinct values of the metadata attributes.

Accordingly, as shown in FIG. 13, the grouping module 360 generates three result data streams, a first result data stream corresponding to dc=east, a second result data stream corresponding to dc=west, and a third data stream corresponding to dc=north. Each result data streams comprises data values generated by aggregating data from the corresponding group of input data streams at a periodicity at which the group by block is executed (which is the periodicity at which the data stream language program is executed).

The grouping module 360 may generate a different set of result data streams if the groupby block specifies a different attribute for grouping. For example, FIG. 13B shows grouping of data streams based on "metric" attribute. The input set 1340b has the same data streams as the set 1340a. The input data stream groups three data streams to generate a results data stream corresponding to the metric=cpuLoad and another result data stream corresponding to metric=cacheMisses.

Figure 14:
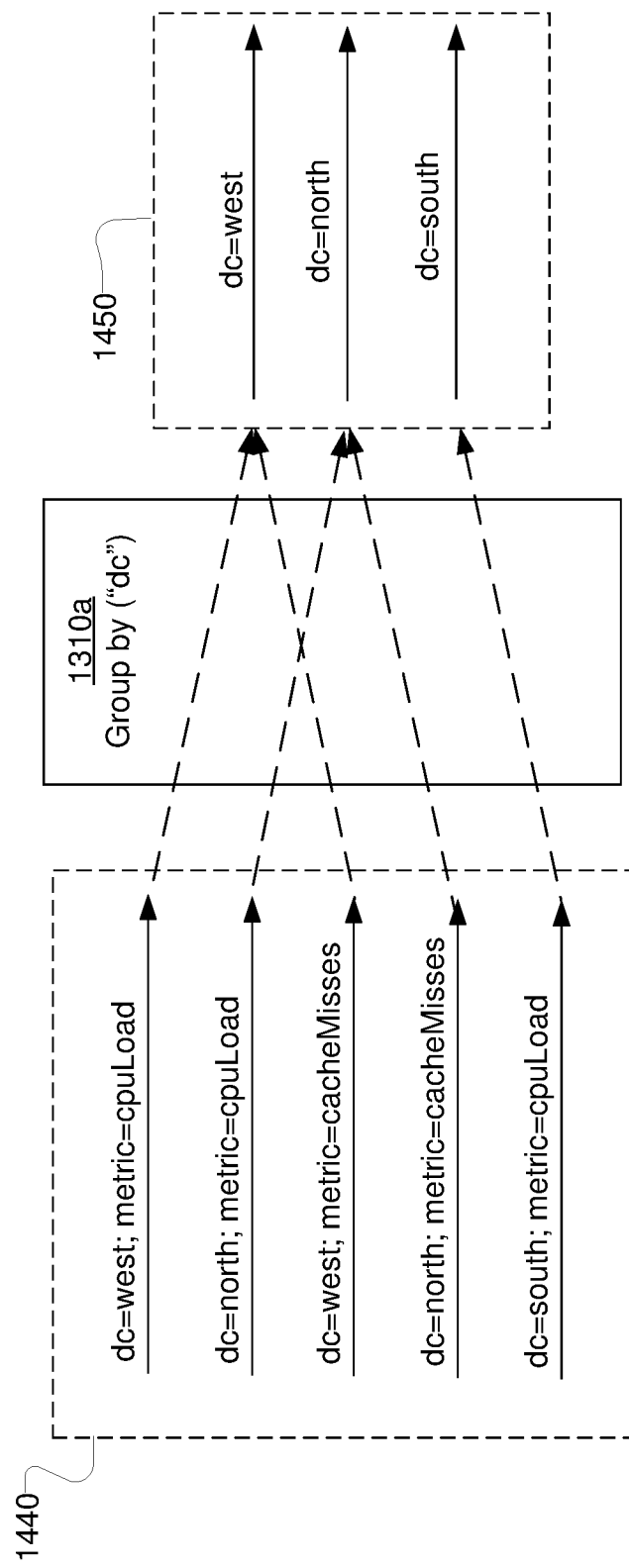
FIG. 14 shows an example scenario illustrating dynamic changing of result data streams generated by a group by block as a result of changes in input data streams over time, according to an embodiment.

FIG. 14 shows an example scenario illustrating dynamic changing of result data streams generated by a groupby block as a result of changes in input data streams over time, according to an embodiment. For example, the group by block shown in FIG. 13a may be executed at a later point in time (for example, for a different time interval) when the input set 1440 of data streams is different from the set 1340a. As shown in FIG. 14, the input set 1440 doesn't include any data stream with attribute dc=east. Furthermore, the input set 1440 includes a data stream with dc=south. Accordingly, the grouping module 360 generates a result set 1450 with three result data streams, a first result data stream corresponding to dc=west, a second result data stream corresponding to dc=north, and a third data stream corresponding to dc=south. Accordingly, the groups generated by the grouping module 360 may dynamically change as the input set of data streams changes. The input set of data streams received from instrumented software executing in development system 120 may change for various reasons, for example, as a result of starting new development systems 120, adding/removing services, or modifying metadata associated with the data streams in the metadata store 230.

Publishing Data Streams as First Class Citizens

According to an embodiment, a data stream language program includes a publish command (i.e., a publish block) that publishes one or more data streams based on result of execution of a data stream language program by providing the data stream to other components of the instrumentation analysis system 100. For example, a data stream generated by a data stream language program may be published to a user interface to be presented as a real time chart or report. The generated data streams are represented as first class citizens. In other words, the generated data streams are represented the same way as a data stream received from an instrumented software of a development system 120 by the instrumentation analysis system 100.

The generated data stream can also be used in the same way as a data stream received by the instrumentation analysis system 100 by other components of the instrumentation analysis system 100. The generated data streams can be associated with metadata attributes automatically by the instrumentation analysis system 100 or by a system administrator via the administration system 160. A find block of a data stream language program can find the generated data stream similar to other data streams received from external systems. Jobs executing other data stream language programs can receive the generated data stream as input and process it. The data of the data stream can be presented via a user interface and can be manipulated based on input received from the user, similar to any other data stream processed by the instrumentation analysis system 100.

The data stream language processor 200 publishes result data streams on the software bus 290. Any component of the instrumentation analysis system 100 that can identify the data stream identifier for any result data stream (or any other data stream) can obtain the data of the date stream from the software bus 290. The software bus 290 may store data of the data streams published in memory to provide fast access to the data.

A data stream language program may generate multiple result data streams for publishing. For example, a data stream language program may aggregate a metric (say, cacheMisses) grouped by data centers. Accordingly, an aggregate attribute (say, total cacheMisses) value is generated for each data center. The publish module 350 generates metadata describing each generated result data stream and stores the metadata in the metadata store 230. The publish module 350 associates data streams with information associated with the data stream language program generating the data stream. Accordingly, the publish module 350 analyzes the blocks of the data stream language program generating the data stream and identifies information identifying the data stream from blocks of the data stream language program.

The publish module 350 may generate metadata attributes describing a data stream based on attributes of the data streams received as input by the data stream language program generating the published data stream. For example, if a data stream language program computes a moving average of an input data stream, the publish module 350 associates metadata attribute values based on the input data stream with the published data stream as well. In this situation, the publish module 350 may use the source name of the input data stream as the source name of the input data stream. If the published data stream is obtained by aggregating a plurality of input data streams, the publish module 350 may generate an attribute for the published data stream by aggregating attribute values based on the input data streams (for example, by concatenating corresponding attribute values from the input data stream or by concatenating substrings obtained by shortening attribute values from the input data stream). For example, the source name of the result data stream may be obtained by concatenating source names of the input data streams that are aggregated or by concatenating prefix strings of the source names of the input data streams.

In an embodiment, a publish block is associated with a metric name characterizing the type of data being published. The publish module 350 associates the metric name of the publish block with data streams published by the publish block. The data stream language processor 200 also generates an identifier (called a time series identifier) for representing each result data stream. The data of each result data stream is stored in the time series data store 260 and is available for use by any component of the instrumentation analysis system.

If the publish block is not associated with a metric name, the publish module determines a metric name based on the input data streams received by the data stream language program that generated the data stream being published. If the data stream language being published is generated from a single data stream, the publish module uses the metric name of the single data stream as the metric name of the published data stream. If the data stream language being published is generated from a plurality of data streams, the publish module generates a metric name for the published data stream based on the metric names of the plurality of data streams, for example, by concatenating the metric names or substrings of metric names (e.g., prefixes or suffixes).

Figure 15:
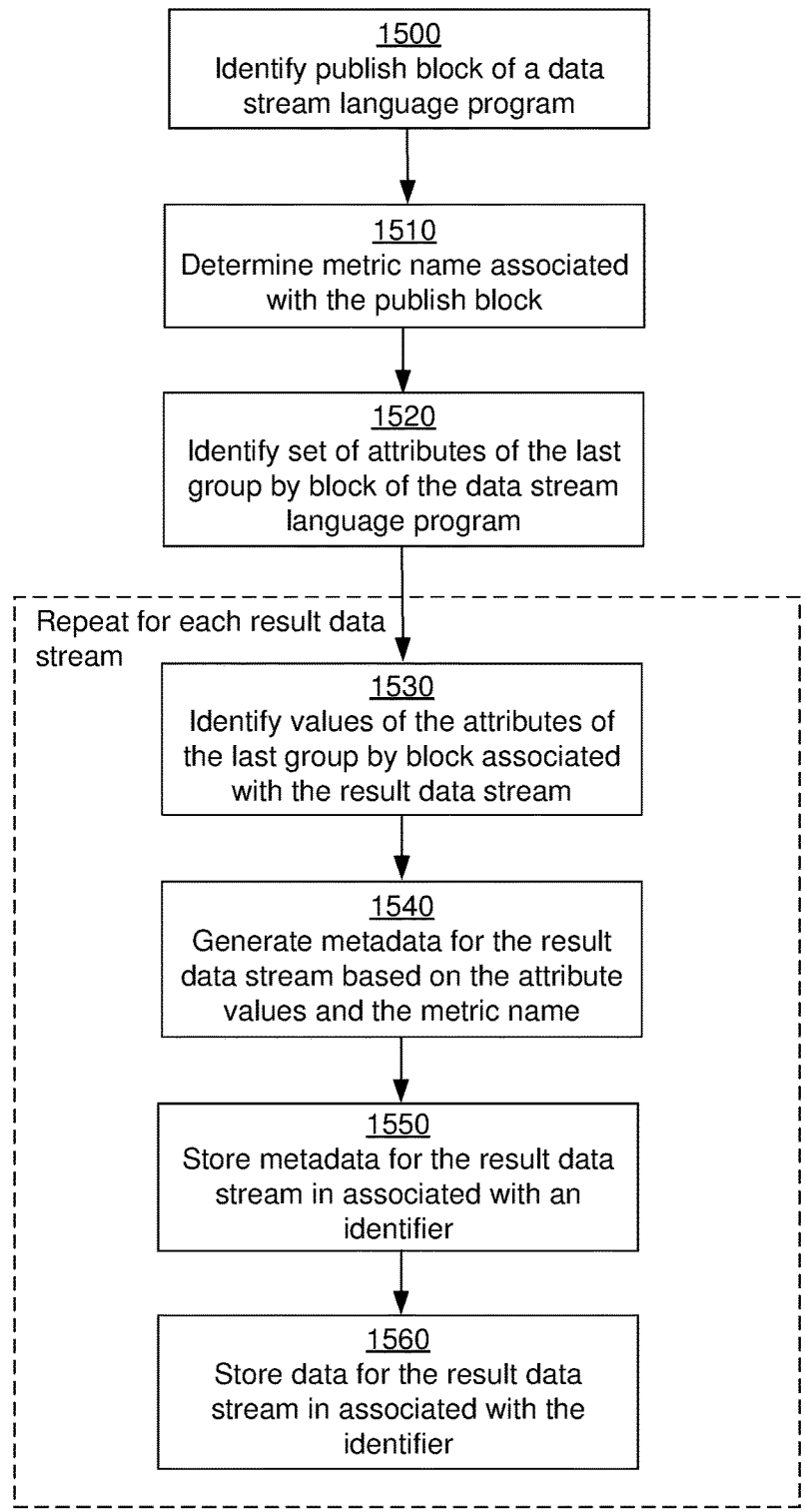
FIG. 15 shows a flowchart illustrating the process of publishing result data streams obtained by executing a publish block of a data stream language program, according to an embodiment.

FIG. 15 shows a flowchart illustrating the process of publishing result data streams obtained by executing a publish block of a data stream language program, according to an embodiment. The data stream language program is assumed to include a publish block and one or more groupby blocks. The publish block is assumed to be associated with a metric name. For example, the data stream language program may be as follows:

find("source:analytics*", "metric:load"))→
   fetch( )→
   groupby("datacenter")→
   stats!mean→
   publish("dc_load")

The above data stream language program includes a publish block that specifies a metric name "dc_load." The data stream language program also includes a groupby statement for grouping the input data streams by datacenter.

The data stream language processor 200 identifies 1500 a publish block in the data stream language program being processed. For example, if the above data stream language program is being processed, the data stream language processor 200 identifies 1500 the last block of the data stream language program, i.e., publish("dc_load"). The publish module 350 determines 1510 a metric name associated with the publish block. For example, in the publish block of the data stream language program shown above, the publish module 350 determines 1510 the metric name "dc_load", associated with the publish block. The data stream language processor 200 uses the metric name as a metadata attribute describing the result data streams.

The output of the publish block may include multiple result data streams, for example, if the data stream language program includes a groupby block. The above example data stream language program may generate multiple result data streams, one for each datacenter, i.e., one result data stream based on the statistical mean data values periodically obtained from all data streams having a distinct datacenter attribute value. Other data stream language programs may include multiple groupby blocks. However, the number of result data streams generated by a data stream language program is determined by the last groupby block of the data stream language program.

The publish module 350 identifies 1520 the set of attributes of the last groupby block of the data stream language program. In the above example, the groupby("datacenter") block has a single attribute "datacenter" by which the data streams are grouped. However, a groupby block may include multiple attributes for grouping the data streams. For example, the groupby command groupby("datacenter", "region") specifies two attributes "datacenter" and "region" by which the data streams are grouped. The publish module 350 uses distinct values of the identified set of attributes for distinguishing result data streams generated by the data stream language program.

The data stream language processor 200 (and its component modules) performs the following steps for each result data stream. The publish module 350 identifies values of the identified attributes of the last group by block that are associated with the result data stream. The values of the identified attributes associated with the result data stream may be either received with the data stream or fetched from the metadata store 230 given the identifier of the input data streams of the groupby block. If the input set of data streams includes data streams having different datacenter values, for example, "east", "west", "north", "south" and so on, each result data stream output by the groupby block (and the data stream language program if the groupby block is the last groupby block of the data stream language program) is associated with one of these datacenter values. If the groupby block specifies multiple attributes for grouping, each result data stream is associated with a distinct set of values of the attributes specified the groupby block for grouping.

The data stream metadata generator 370 generates 1540 the metadata describing the result data stream based on the values of the identified attributes associated with the result data stream and the metric name associated with the publish block. For example, if the groupby block specifies the data center attribute (with values "east", "west", "north", "south") and the metric name specified with the publish block is cpu_load, the data stream metadata generator 370 associates each published data stream with the metric name cpu_load and the corresponding value of the datacenter attribute (associated with the group of data streams). The data stream metadata generator 370 also generates an identifier for the result data stream. The data stream metadata generator 370 stores 1550 the metadata comprising the attributes associated with the result stream in the metadata store 230.

The data stream language processor 200 periodically executes the data stream language program as specified by the periodicity of the data stream language program. The data stream language processor 200 generates data for each result data stream when the data stream language program is executed. The data stream language processor 200 stores 1560 the generated data for each result data stream in association with the identifier for the result data stream.

Anomaly Detection Using Threshold Blocks

The data stream language program supports threshold blocks that allow data of a set of data streams to be compared against threshold values. The data streams being compared may be data streams received by the instrumentation analysis system 100 from instrumented software of development systems 120 or data streams obtained as a result of execution of one or more blocks of data stream language programs. The threshold block includes a data port and a threshold port. The data port receives one or more data streams representing data values. The threshold port receives one or more data streams representing threshold values. The threshold block compares data values against threshold values to determine whether the data values are within a range specified by the threshold values. In an embodiment, the threshold block includes more than one threshold ports. For example, the threshold block may include two threshold ports, a low threshold port and a high threshold port. The threshold block determines whether the data values are below the threshold values received in the high threshold port and above the threshold values received in the low threshold port.

The threshold block allows specification of a high threshold value and/or a low threshold value. The threshold module 340 processes a threshold block by comparing data values received in incoming streams with threshold values specified by the threshold block. The threshold block specifies a low threshold and a high threshold. The threshold module 340 generates an event if the data values from the input data streams received by the threshold block lie outside the bounds set of the high threshold value and/or the low threshold value. In other words, the threshold module 340 generates an event if data of a data stream exceeds a high threshold value or falls below a low threshold value. The threshold values may be fixed or dynamic. A dynamic threshold value is obtained as a result of execution of a data stream language program. A threshold block may specify either one of low/high threshold or both.

The input to the threshold block may be a plurality of data stream values generated as a result of executing blocks of a data stream language program, for example, a plurality of data streams obtained as a result of grouping a set of input data streams. In this situation, the low threshold or the high threshold is also specified as the output of a data stream language program that generates a plurality of data streams. The threshold module 340 matches data streams received by the input port of the threshold block with data streams received by the low/high threshold ports. The threshold module 340 compares the data of the data streams received by the input port with data of the data streams received by the low/high threshold ports for each time interval (based on the periodicity of the data stream language program) and takes action based on the comparison (e.g., sending events).

In an embodiment, the threshold block specifies a time duration and a fraction value. For example, the threshold block may specify a time duration T (say 5 minutes). The threshold module 340 generates an event if the data of an input data stream is outside the specified threshold values for more than the specified time duration T. For example, if the data of an input data stream is higher than the high threshold for more than T time units, the threshold module 340 generates an event. As another example, if the data of an input data stream is below the low threshold for more than T time units, the threshold module 340 generates an event. The ability to specify the time duration ensures that the abnormal behavior of data of the data stream lying outside the threshold boundaries persists for a significant amount of time and is not a transient behavior.

In an embodiment, the threshold block specifies a fraction value F (say 0.8) along with the time duration T. The threshold module 340 generates an event if the data of an input data stream lies outside the threshold boundaries for more than the specified fraction of the time duration T during a window of the specified length T. Accordingly, the threshold module 340 generates an event even if the data of an input data stream is not outside the threshold boundaries for the entire time duration T, so long as the data is outside the threshold boundaries for at least the specified fraction of the time duration.

Figure 16:
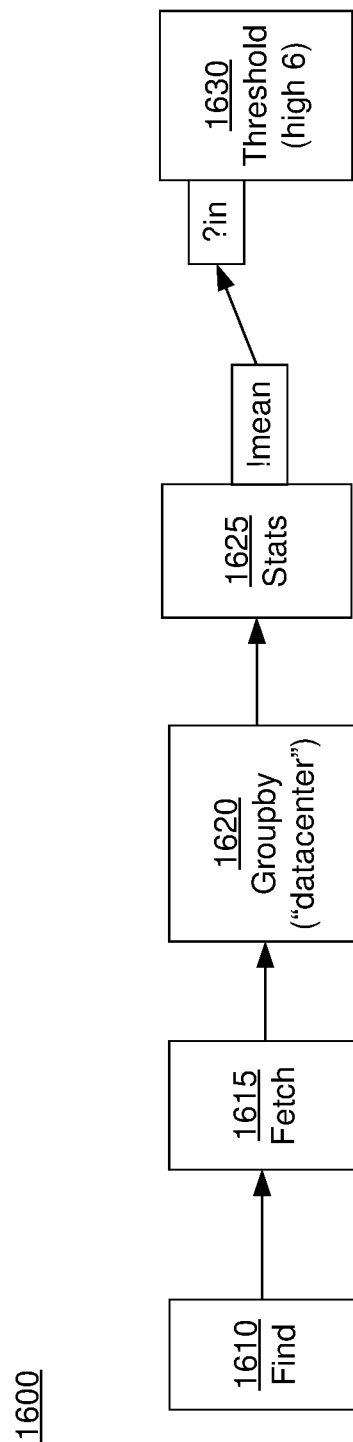
FIG. 16 shows an example of a data stream language program illustrating use of a threshold block with fixed threshold values for data streams grouped by a particular attribute, according to an embodiment.

FIG. 16 shows an example of a data stream language program illustrating use of a threshold block with fixed threshold values for data streams grouped by a particular attribute, according to an embodiment. The data stream language processor 200 receives the data stream language processor shown in FIG. 16 and processes it.

The find module 310 executes the find block 1610 to identify a set of data streams that are input to the data stream language program 1600. The fetch module 320 executes the fetch block 1615 to fetch the data of the data streams at the periodicity specified for the data stream language program. The grouping module 360 executes the groupby block 1620 to group the data streams identified by the find block based on the datacenter values into a set of data streams, each data stream of the set corresponding to a distinct datacenter value occurring in the identified data streams. The computation module 330 executes the stats block 1625 to determine the mean values corresponding to data from each data center. The computation module 330 provides the output of the stats block 1625 as input to the in port of the threshold block.

The threshold module 340 compares data of each data stream input to the high threshold value of the threshold block 1630. As shown in FIG. 16, the high threshold value of the threshold block 1630 is a fixed value (i.e., the fixed value 6). Accordingly, if any data value of a data stream for any group (corresponding to a data center) exceeds the high threshold value of 6, the threshold module 340 generates an event. The threshold module 340 provides the details of the data stream exceeding the threshold value in the event as name value pairs. For example, the threshold module 340 may provide details of the data center attribute value corresponding to the data stream that exceeded the high threshold value, the timestamp of the time at which the high threshold was exceeded and so on. Since the threshold block 1630 does not specify a low threshold value, the threshold module 340 does not compare the data of the data streams input to the threshold block 1630 to any low threshold value.

Figure 17:
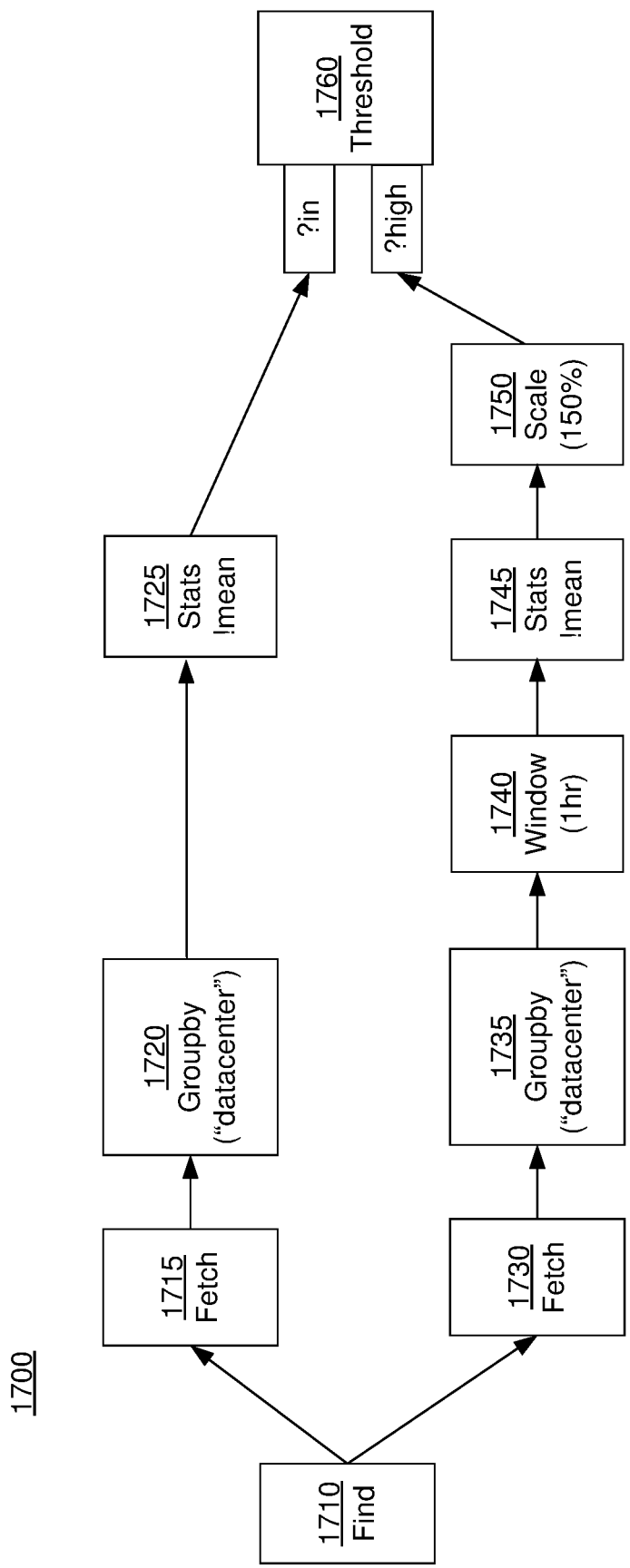
FIG. 17 shows an example of a data stream language program illustrating use of a threshold block with dynamically changing threshold values for data streams grouped by metadata attributes, according to an embodiment.

FIG. 17 shows an example of a data stream language program illustrating a threshold block with dynamically changing threshold values for data streams grouped by metadata attributes, according to an embodiment. The data blocks providing input to the in port of the threshold block 1760 of FIG. 17 are similar to the data blocks providing input to the threshold block 1630 of FIG. 16. Accordingly, blocks 1710, 1715, 1720, 1725 of FIG. 17 correspond to blocks 1610, 1615, 1620, and 1625 of FIG. 16 respectively. However, the input to the high port of the threshold block 1760 receives a dynamically changing input. Furthermore, the high port of the threshold block 1760 receives a plurality of data streams as input. The threshold module 340 matches the plurality of data streams received by the high port of the threshold block 1760 with the plurality of data streams received by the in port.

The fetch module 320 executes the fetch block 1730 to fetch the data of the data streams at the periodicity specified for the data stream language program. The grouping module 360 executes the groupby block 1735 to group the data streams identified by the find block 1710 by the datacenter values into a set of data streams, each data stream of the set corresponding to a datacenter value. The window module 380 executes the window block 1740 to identify data points corresponding to a one hour moving window for each data stream input to the window block 1740. The computation module 330 executes the stats block 1745 to determine the a one hour moving average value for the one hour moving windows corresponding to each data stream output by the window block 1740. The customized block module 390 processes customized macros defined by users by combining built-in blocks of the data stream language. The computation module 330 scales the output of the stats block 1745 by a factor of 150% by executing the scale block 1750. The scaled output of the scale block 1750 is provided as input to the high port of the threshold block 1760.

Accordingly, the threshold module 340 compares a set of result data streams representing the mean of data streams from each datacenter with a one hour moving average of the data of data streams from each data center scaled by 150%. If the data of a result data stream corresponding to a datacenter received by the in port exceeds the scaled moving average value of the data streams for the same data center received at the high port of the threshold block 1760, the threshold module 340 generates an event. Accordingly, FIG. 17 shows an example of a data stream language program illustrating generation of a dynamically changing set of data streams received as input and a dynamically changing set of data streams provided as threshold values for comparison.

Figure 18:
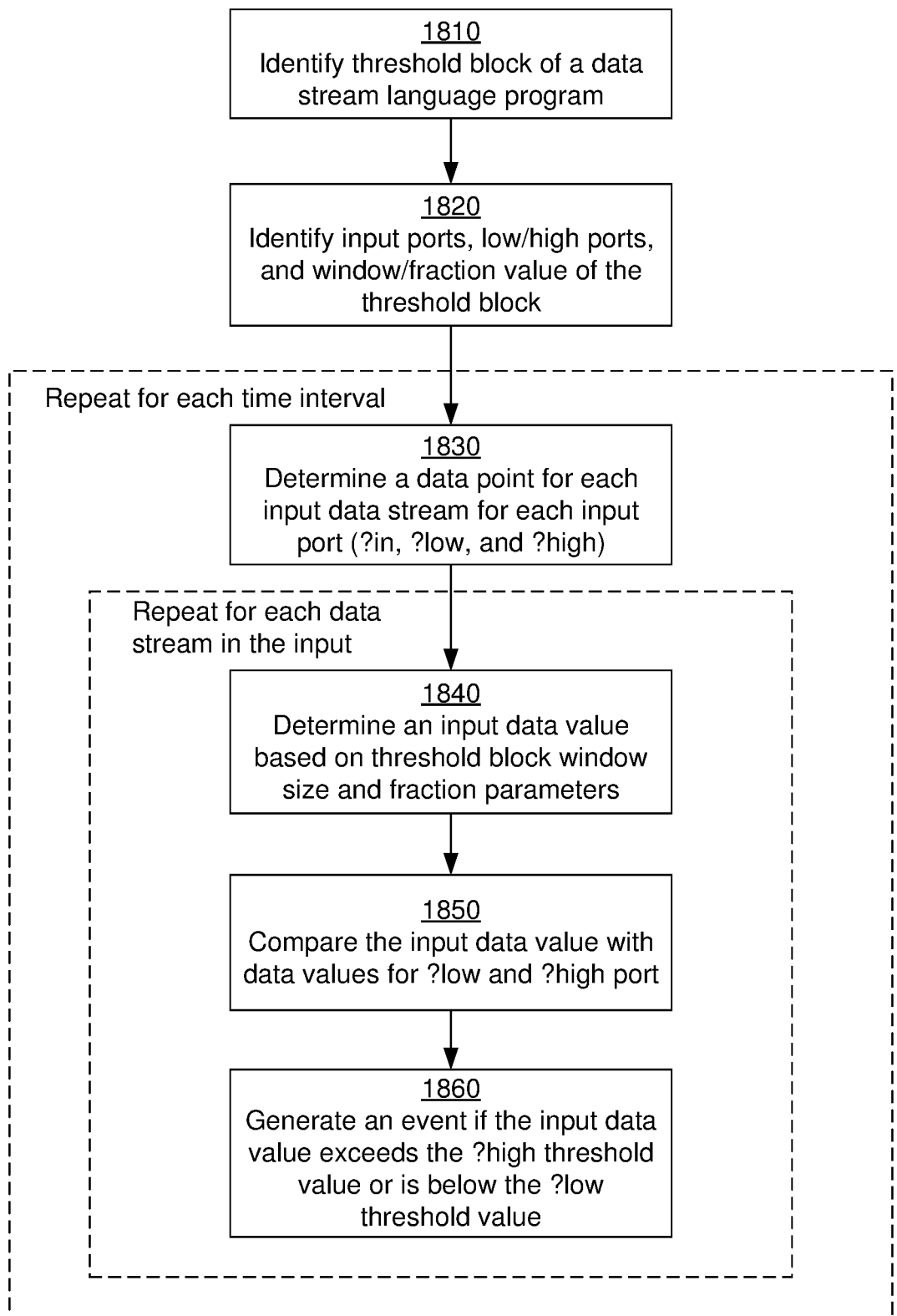
FIG. 18 shows a flowchart illustrating the process of executing a data stream language program including a threshold block, according to an embodiment.

FIG. 18 shows a flowchart illustrating the process of executing a data stream language program including a threshold block, according to an embodiment. The threshold module 340 identifies 1810 a threshold block of a data stream language program being executed. The threshold module 340 identifies 1820 various components and parameters describing the threshold block including the input ports, the low/high threshold ports, the size of a threshold window is specified, and a fraction value associated with the threshold window if specified. In some embodiments, the low and/or high thresholds may be constant values in which case, either a constant value is specified as input to the low/high threshold ports or the low/high threshold values are specified as parameters of the threshold block (without specifying any low/high threshold ports).

The data stream language processor 200 executes the portion of the data stream language program providing input to the input port and the portion of the data stream language program providing inputs to the low/high threshold ports. This execution is repeated based on the periodicity specified for the job corresponding to the data stream language program. The threshold module 340 performs the comparison of data received in the input ports against data received in the low/high threshold ports for each time interval based on the periodicity of the data stream language program. If the portion of the data stream language program providing input to the input port (or the low or high threshold port) includes a groupby block, the input port of the threshold block receives a group of data streams. The number of data streams at each port depends on the distinct values of the metadata attribute (or a set of metadata attributes) specified in the corresponding groupby block (provided there is at least one data stream in the input of the groupby block having that distinct value of the metadata attribute).

In an embodiment, the data stream language processor 200 analyzes the blocks providing data at the input port and low/high threshold ports to identify the last groupby block that occurs before data is input to the threshold block. The threshold module 340 uses the last groupby block to identify the data streams received at each port, for example, to match data streams from the input port against data streams from the low and/or high threshold ports and to identify data streams in events if an event is generated based on a data stream. The threshold module 340 determines that two data streams received at two different ports of the threshold block are matching if they have the same distinct value of the metadata attribute used by the groupby block. For example, if the groupby block used by the data stream language program for generating data streams provided as input to two ports of the threshold block group data streams based on datacenter attribute, the data streams obtained by aggregating data of a particular datacenter (say datacenter east, or datacenter west) are determined to match.

The threshold module 340 performs the following computation for each data stream received at each port (i.e., the input port, the low port, and the high port). The threshold module 340 compares 1850 the data values received at the input port with the data values received at the low threshold port and/or the high threshold port. The threshold module 340 generates an event if the data value received at the input port either exceeds the data value received at the high threshold port or is below the data value received at the low threshold port. The generated event includes information identifying the data streams received at the input port based on the value of the metadata attribute corresponding to the data stream.

In an embodiment, the data port of the threshold block receives a first plurality of data streams generated as a result of grouping an input set of data streams based on a group by command that groups the input set of data streams based on a first set of metadata attributes (for example, region and data_center). The threshold port of the threshold block receives a second plurality of data streams generated as a result of grouping an input set of data streams based on a group by command that groups the input set of data streams based on a second set of metadata attributes. The second set of metadata attributes may be same as the first set of metadata attributes. Alternatively, the second set of metadata attributes may be different from the first set of metadata attributes. In particular, the second set of metadata attributes may be a subset of the first set of metadata attributes. For example, if the first set of metadata attributes includes region and data_center, the second set of metadata attributes includes only regions. As another example, the first set of metadata attributes includes region, data_center, machine_id the second set of metadata attributes includes only region and data_center. Accordingly, the threshold input receives fewer data streams than the data input of the threshold block. As a result, a plurality of data streams received at the data port may be compared with the same data stream received at the threshold port. In the above example, the data port receives a data stream for each distinct combination of values of region, data_center, machine_id and the threshold port receives a data stream for each distinct combination of values of region, data_center. Accordingly, all data streams corresponding to a region and data_center received at the data port are compared against the same data stream received at the threshold port irrespective of the machine_id value associated with the data stream received at the data port.

If the threshold block specifies a threshold window, the threshold module 340 compares all data points at the input port received during the last window of the specified threshold window size against the data value received at the low and/or high threshold port. If all the data values occurring during the identified window lie outside the specified boundaries based on the threshold (i.e., are either greater than the high threshold or below the low threshold), the threshold block generates an event.

If the threshold block specifies a fraction parameter in addition to the threshold window size, the threshold module 340 compares the data points received at the input port during the last window of the specified threshold window size against the data value received at the low and/or high threshold port. The threshold module 340 generates an event if more than the specified fraction of data points from the identified window are outside the bounds specified by the threshold block. For example, if the fraction value is 0.75 (i.e., 75%), the threshold module 340 generates an event if more than 75% of data points from the identified window are outside the bounds specified by the threshold block. In an embodiment, the threshold module 340 generates an event if data points occurring during more than the specified fraction of the identified window are outside the bounds specified by the threshold block. For example, if the fraction value is 0.75 (i.e., 75%), the threshold module 340 generates an event if data points occurring during more than 75% of the identified window are outside the bounds specified by the threshold block.

Customized Blocks for Data Stream Language Programs

A customized block can be specified by a user by combining existing built-in blocks of the data stream language. A customized block is also referred to as a macro block or a customized macro block. The ability to define customized macro blocks makes the data stream language extensible. A customized block can be included in a data stream language program similar to the built-in blocks. A customized block can use other customized macro blocks allowing arbitrary nesting of customized macro blocks. A user can specify arbitrary abstractions using customized blocks. A customized block is executed at the periodicity specified for the job executing the data stream language program including the customized macro block. The customized block module 390 determines the input values for each input port of the customized macro block for each time interval.

The customized block module 390 executes the instructions of the customized macro block and generates data values for each output port. The output values from the output port may be provided to subsequent blocks. If an input to the customized block comprises blocks including a groupby block, the input port may receive a plurality of data streams as input. The customized block module 390 executes the instructions of the customized block module 390 for each data point of each data stream received at the input. The number of data streams may be dynamically changing based on changes in the overall set of data streams received by the data stream language program including the customized macro block. A customized macro block may be associated with one or more parameters that are used in the instructions of the customized block. The instructions of the customized macro block use parameter values. However, when the customized macro block is specified in a data stream language program, specific values for each parameter are provided. Accordingly, the customized block module 390 substitutes the parameter names for the parameter values while executing the instructions of the customized macro block.

Figure 19:
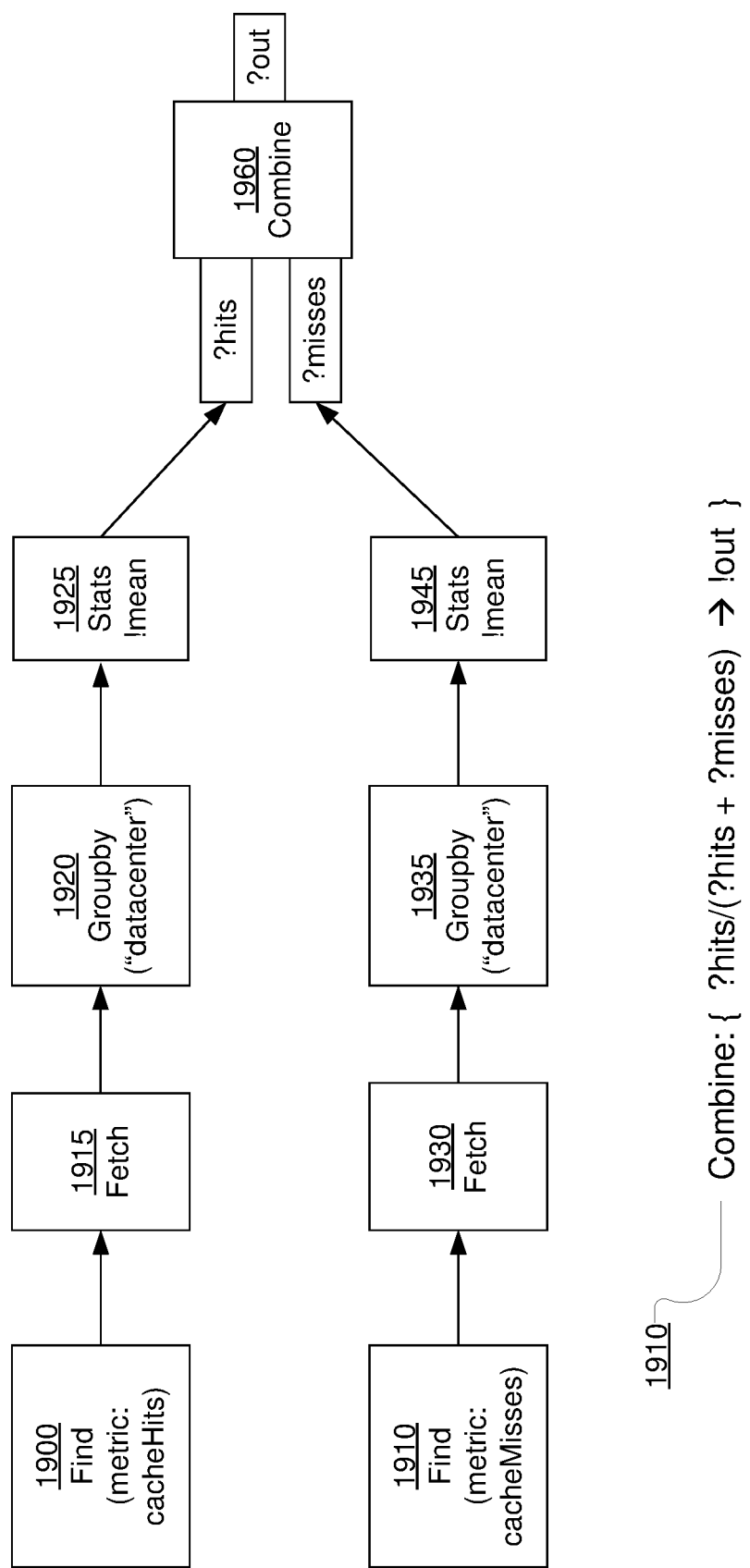
FIG. 19 shows an example of a data stream language program illustrating use of a customized block for generating a result data stream based on a user defined function applied to inputs comprising groups of data streams, according to an embodiment.

FIG. 19 shows an example of a data stream language program illustrating use of a customized block for generating a result data stream based on a user defined function applied to inputs comprising groups of data streams, according to an embodiment. The example customized macro block 1960 combines data of two input data streams to generate a function based on the input data values. The combine block 1960 has two input ports hits and misses and one output port out. The input to each input port is generated by a portion of the data stream language program.

For example, the input to the input port hits is generated as output of the stats block 1925 and the input of the input port misses is generated as output of the starts block 1945. The find module 310 executes the find block 1900 to find all data streams received by the instrumentation analysis system 100 that have the metric values cacheHits. For example, the find module 310 may execute the find block 1900 to find all data streams received from development systems 120 that provide values of cache hits. The fetch module 320 executes the fetch block 1915 to fetch the data of the data streams identified by the find block 1900. The grouping module executes the groupby block 1920 to group the data streams by datacenter attribute. The computation module 330 executes the stats block 1925 to generate the mean of data from all data streams for each distinct datacenter and provides the data as input to the hits port of the combine block 1960.

Similarly, the find module 310 executes the find block 1910 to find all data streams received by the instrumentation analysis system 100 that have the metric values cacheMisses. For example, the find module 310 may execute the find block 1910 to find all data streams received from development systems 120 that provide values of cache misses. The fetch module 320 executes the fetch block 1930 to fetch the data of the data streams identified by the find block 1900. The grouping module executes the groupby block 1935 to group the data streams by the datacenter attribute. The computation module 330 executes the stats block 1945 to generate the mean of data from all data streams for each distinct datacenter and provides the data as input to the hits port of the combine block 1960.

The customized block module 390 executes the set of instructions 1910 specified for the combine block. Accordingly, for each time interval, the customized block module 390 determines the value of H/(H+M) if H represents the data value received at the hits input port and M represents the value of misses received at the misses port. The customized block module 390 provides the value of the above expression to the output port. The data stream language processor 200 provides the data values from the output port to the input port of a subsequent block, if any.

Figure 20:
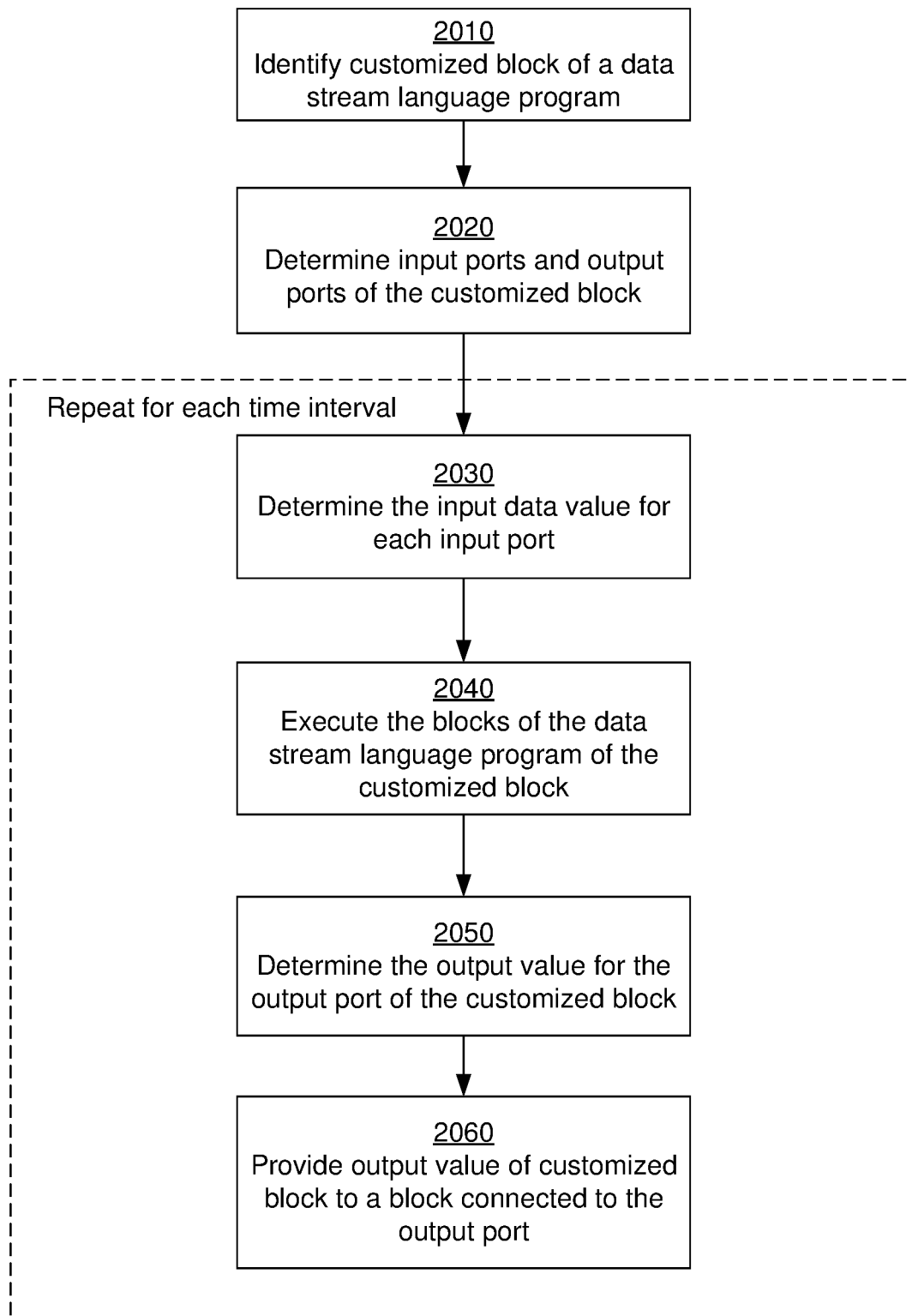
FIG. 20 shows a flowchart illustrating the process of executing a data stream language program with a customized block, according to an embodiment.

FIG. 20 shows a flowchart illustrating the process of executing a data stream language program with a customized block, according to an embodiment. The data stream language processor identifies 2010 a customized blocks of data stream language program. The customized block module 390 identifies 2020 the input ports and the output ports of the customized block. If the customized block specifies parameter values, the customized block module 390 receives values to be substitutes for the parameters and substitutes them in the instructions specified by the customized block.

The customized block module 390 repeats the following steps for each time interval. The customized block module 390 determines the input data value for each input port. If the portion of the data stream language program generating input for an input port includes a groupby block, the input to the port may comprise multiple data values corresponding to each data stream generated by the groupby block.

The customized block module 390 executes the instructions of the customized block for each data value. If there are multiple data streams input at each port, the customized block module 390 identifies matching data streams by comparing the values of the metadata attribute of the groupby blocks for each input port. The customized block module 390 executes 2040 the instructions for each data stream that is input to the input ports. If an input port has a constant input value and another input port has a plurality of data streams, the customized block module 390 applies the constant value to each data stream of the other input port.

The customized block module 390 provides the value of the result of execution of the instructions of the customized block to the output ports as specified in the instructions of the customized block. The data stream language processor 200 provides the values at the output ports to the blocks of the data stream language program connected to the output ports. A customized block may output multiple data streams at an output port. For example, the input ports of the customized block may each receives multiple data streams and the customized block may perform a particular computation on tuples comprising values from matching data streams received at each input port.

The instructions of a customized data block may include other customized data blocks. Accordingly, the above process illustrated in FIG. 20 is executed for each customized block.

User Interface for Generating Reports Using Data Stream Language Programs

In some embodiments, the instrumentation analysis system 100 provides a user interface that generates data stream language programs for the end user interested in viewing the reports based on data streams. The user is provided with a user friendly user interface that hides the complexity of the data stream language. The user interface provided by the instrumentation analysis system shows various widgets that allow users to take actions such as select the metrics for generating reports, performing rollups, grouping data streams and so on.

Figure 21:
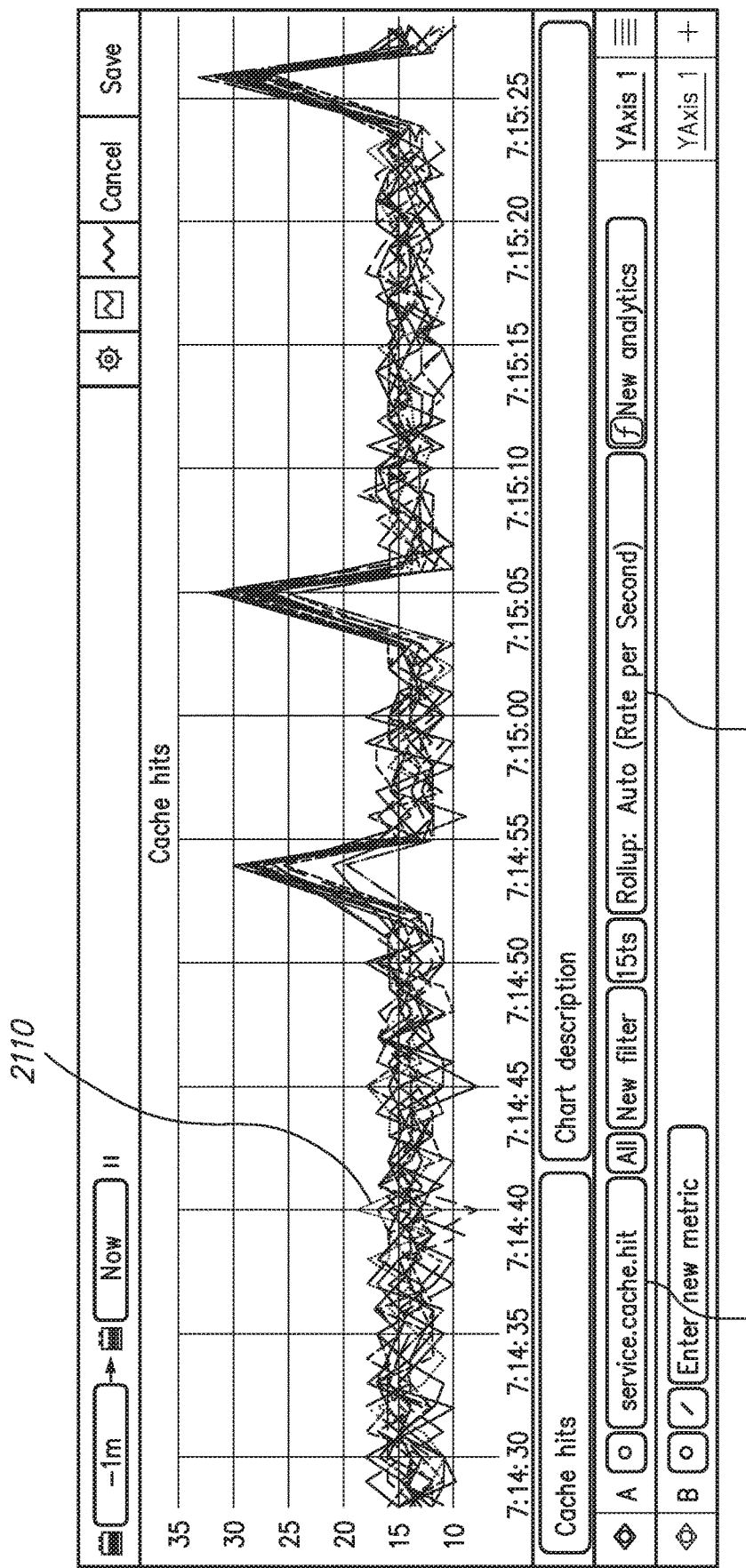
FIG. 21 shows a screenshot of a user interface displaying result of execution of a data stream language program that shows data streams received by the instrumentation analysis system, according to an embodiment.

FIG. 21 shows a screenshot of a user interface displaying result of execution of a data stream language program that shows data streams received by the instrumentation analysis system, according to an embodiment. The screenshot shows several charts 2120 displaying data streams representing metric 2120 service.cache.hits. The metric represents cache hit values received from instrumented software executing on development systems 120. The values are rolled up to a time interval of 1 second. Accordingly, the cache hits values received in each time interval of one second are added together. There can be a large number of services reporting the metric service.cache.hits and accordingly a large number of charts 2120 is displayed. FIG. 21 shows various widgets that allow a user to take actions, for example, select the metric that is reported by the user interface, perform rollups.

Figure 22:
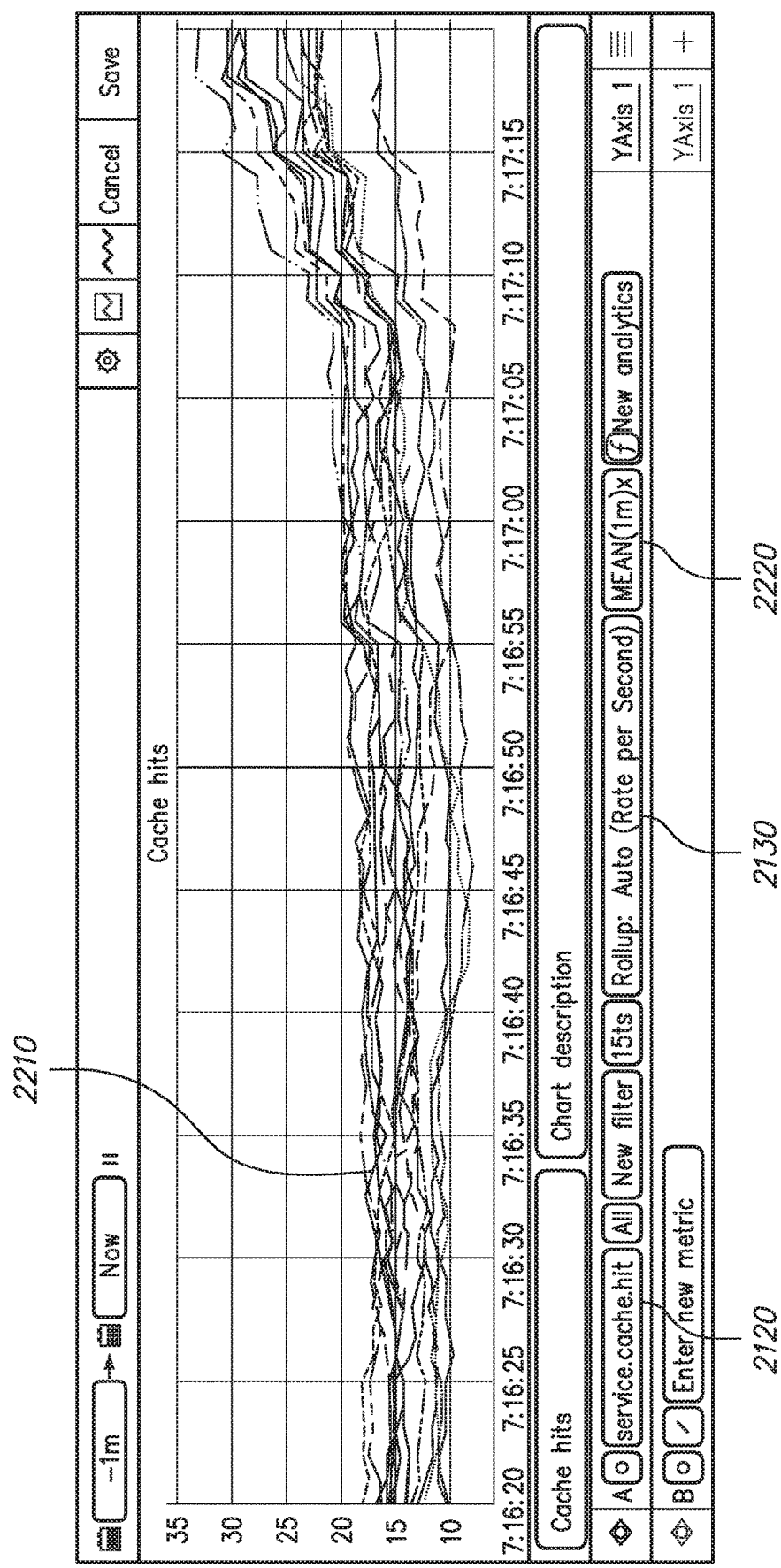
FIG. 22 shows a screenshot of a user interface displaying result of execution of a data stream language program showing 1 minute average of data of data streams received by the instrumentation analysis system, according to an embodiment.

FIG. 22 shows a screenshot of a user interface displaying result of execution of a data stream language program showing 1 minute average of data of data streams received by the instrumentation analysis system, according to an embodiment. FIG. 22 shows a widget that allows a user to specify certain computations to be performed on the data streams. Specifically, FIG. 22 shows a widget 2220 that computes a one minute mean for each data stream. As a result the charts 2210 are smoother than the charts shown in FIG. 21. However the number of charts 2210 shown in FIG. 22 is same as the number of charts 2210 shown in FIG. 21.

Large enterprises may have a very large number of development systems 120. Each development system may execute multiple services, each service reporting the metrics. As a result, the number of charts displayed in FIGS. 21 and 22 can be very large. A user can gain better insight into the data reported by data streams by grouping the data streams as shown in FIG. 23.

Figure 23:
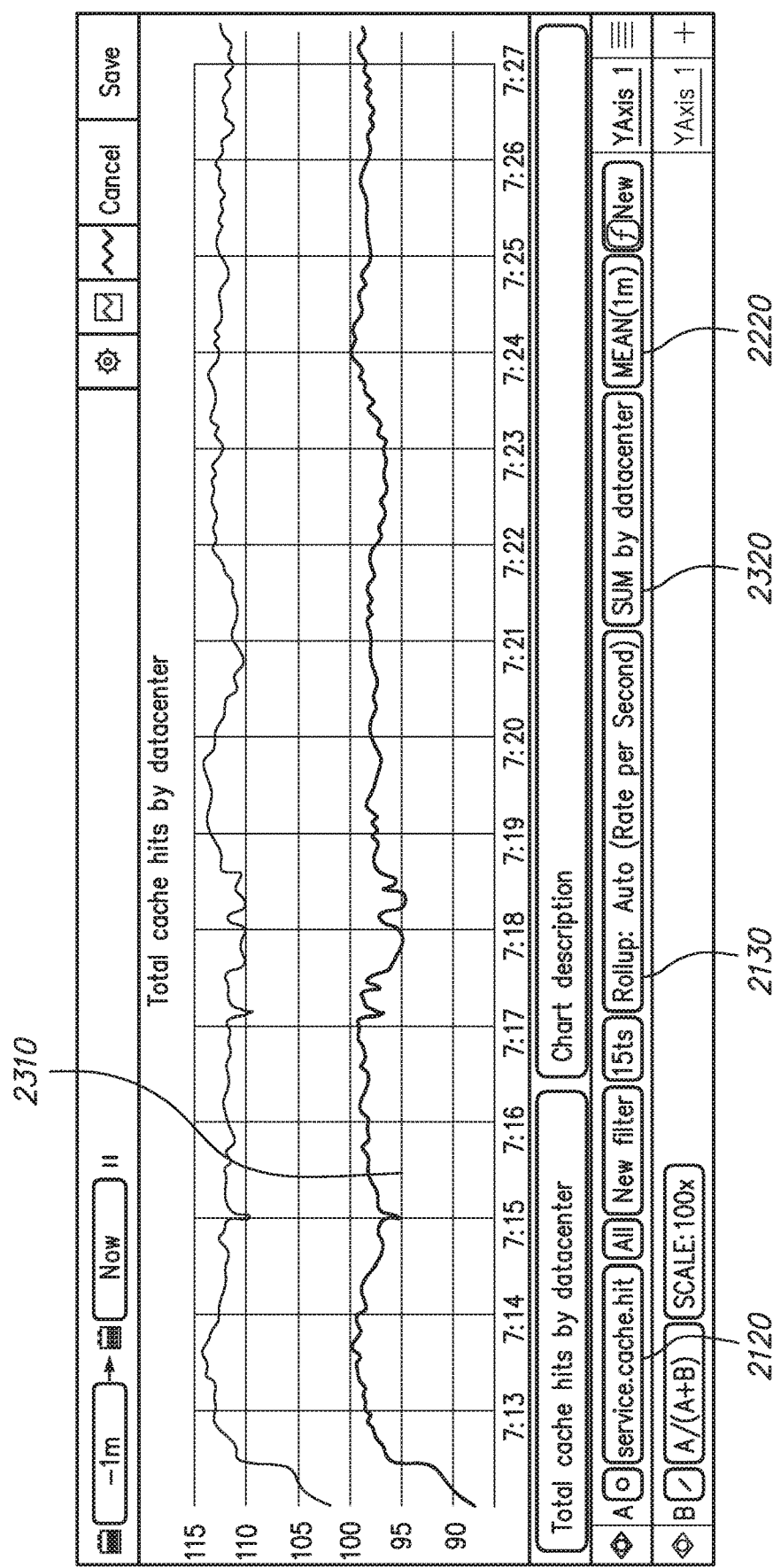
FIG. 23 shows a screenshot of a user interface displaying result of execution of a data stream language program showing sum of data streams grouped by data center, according to an embodiment.

FIG. 23 shows a screenshot of a user interface displaying result of execution of a data stream language program showing sum of data streams grouped by data center, according to an embodiment. FIG. 23 shows widget 2320 that allows specification of attribute by which the data streams are grouped and the aggregation operation performed for each group. As shown in FIG. 23, the user has requested grouping by data center and performing the sum operation for each group. Assuming there are only two data centers, the number of charts is reduced to two. Each chart 2310 shows the sum of data values of data streams received from a particular data center.

Figure 24:
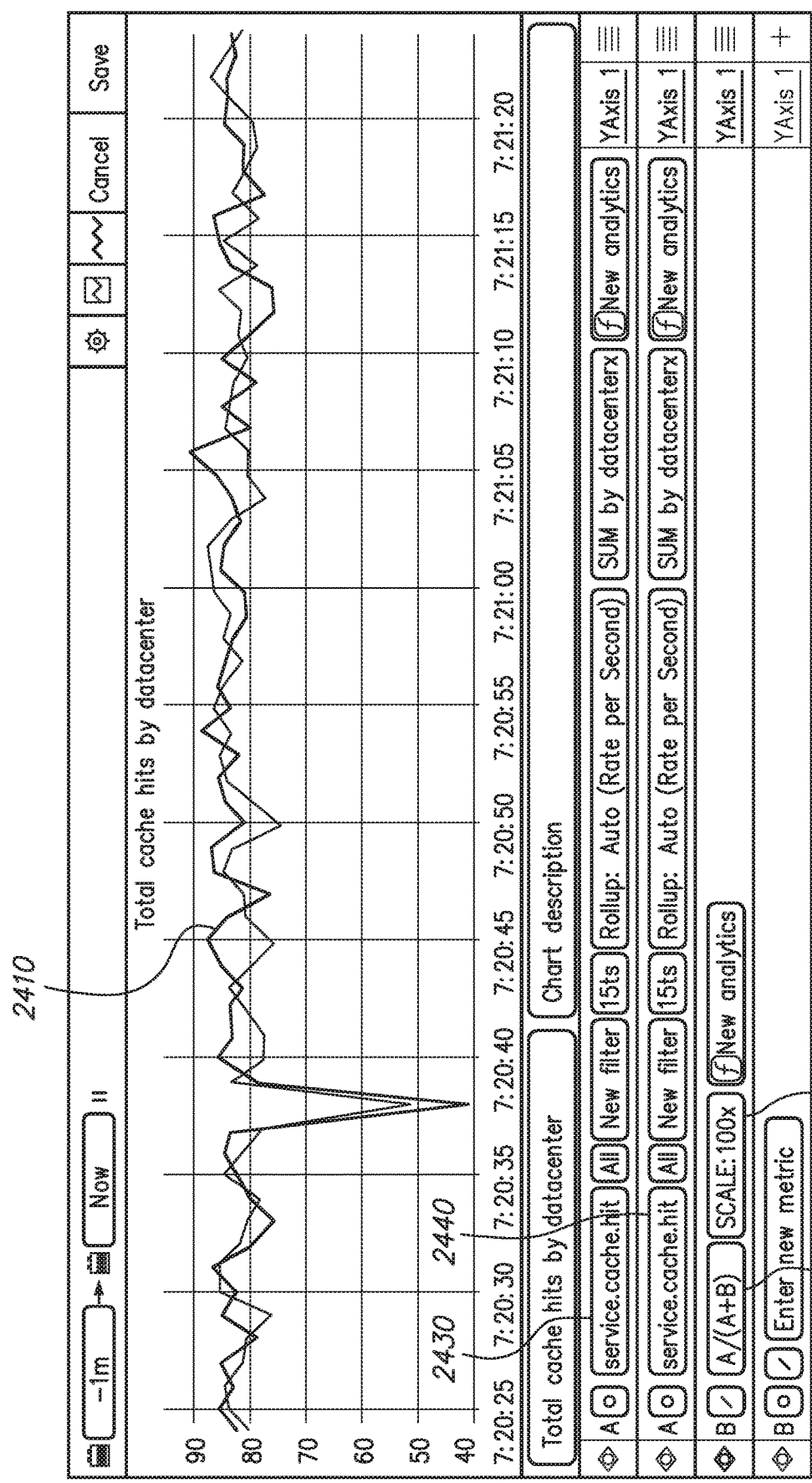
FIG. 24 shows a screenshot of a user interface displaying result of execution of a data stream language program including a customized macro block that determines ratio of cache hit rate and sum of cache hit rate and miss rate for data streams grouped by datacenters, according to an embodiment.

FIG. 24 shows a screenshot of a user interface displaying result of execution of a data stream language program including a customized macro block that determines ratio of cache hit rate and sum of cache hit rate and miss rate, for data streams grouped by datacenters, according to an embodiment. As shown in FIG. 24, a user refers to data streams reporting metric service.cache.hit using the widget 2430 as A. The user further refers to data streams reporting the metric service.cache.miss using the widget 2440 as B. The user defines the computation A/(A+B) as the ratio of the cache hit with respect to the sum of cache hits and cache misses. The user further specifies using widget 2450 that the value A/(A+B) computed should be scaled by a multiple of 100. This computation is performed for each group of data streams based on datacenter. Accordingly, a chart 2410 is generated for each data center reporting real time values of cache hit ratio for all data streams received from the data center.

Alternative Embodiments

It is to be understood that the Figures and descriptions of the present invention have been simplified to illustrate elements that are relevant for a clear understanding of the invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for processing a dynamically changing set of data streams, the method comprising:
    receiving a set of instructions comprising at least a find block associated with a search expression, the search expression based at least in part on an attribute that describes multiple data streams and evaluate the search expression to identify the data streams conforming to the search expression, the data streams providing data generated by instrumented software;
    executing the find block, during a time interval determined based on a periodicity associated with the find block, to determine a set of data streams from the data streams that satisfies the search expression;
    selecting, from the data streams, a data stream that has a largest periodic time interval that is smaller than the time interval based on the periodicity associated with the find block;
    generating one or more result data values based on the executing, the result data values corresponding to the data stream;
    causing display of the data streams through a user interface, wherein the data streams are associated with a publish block, the publish block associated with a metric name; and
    for each data stream:
        utilizing the metric name of the publish block as an attribute describing the data stream, and
        storing the attribute based on the metric name with metadata describing the data stream.

2. The computer-implemented method of claim 1, wherein the set of instructions comprise a grouping command specifying grouping of data across data streams, wherein the grouping command identifies one or more attributes.

3. The computer-implemented method of claim 2, wherein the grouping command, groups data of the data streams by a set of metadata attributes and each result data stream corresponds to a distinct set of values of the set of metadata attributes.

4. The computer-implemented method of claim 1, wherein evaluation of the find block is triggered by events occurring in an instrumentation analysis system that processes data streams based on instructions specified in a data stream language.

5. The computer-implemented method of claim 1, wherein the find block is re-evaluated when there are changes in the data streams.

6. The computer-implemented method of claim 1, wherein the data streams are associated with a publish block, the publish block associated with a metric name.

7. The computer-implemented method of claim 1, wherein one or more data streams from the data streams are generated as result data streams obtained as a result of execution of another set of instructions.

8. The computer-implemented method of claim 1, wherein metadata describing the data streams is received independent of the data of one of the data streams.

9. A system for processing a dynamically changing set of data streams, the system comprising:
   at least one memory having instructions stored thereon; and
   at least one processor configured to execute the instructions, wherein the at least one processor is configured to:
      receive a set of instructions comprising at least a find block associated with a search expression, the search expression based at least in part on an attribute that describes multiple data streams, and evaluate the search expression to identify the data streams conforming to the search expression and providing data generated by instrumented software;
      execute the find block, during a time interval determined based on a periodicity associated with the find block, to determine a set of data streams from the data streams that satisfies the search expression;
      select, from the data streams, a data stream that has a largest periodic time interval that is smaller than the time interval based on the periodicity associated with the find block;
      generate one or more result data values based on executing the find block, the result data values corresponding to the data stream;
      cause display of the data streams through a user interface, wherein the data streams are associated with a publish block, the publish block associated with a metric name; and
      for each data stream:
         utilize the metric name of the publish block as an attribute describing the data stream, and
         storing the attribute based on the metric name with metadata describing the data stream.

10. The system of claim 9, wherein the set of instructions comprise a grouping command, specifying grouping of data across data streams, wherein the grouping command identifies one or more attributes.

11. The system of claim 10, wherein the grouping command, groups data of the data streams by a set of metadata attributes and each result data stream corresponds to a distinct set of values of the set of metadata attributes.

12. The system of claim 9, wherein evaluation of the find block is triggered by events occurring in an instrumentation analysis system that processes data streams based on instructions specified in a data stream language.

13. The system of claim 9, wherein the find block is re-evaluated when there are changes in the data streams.

14. The system of claim 9, wherein the data streams are associated with a publish block, the publish block associated with a metric name, further configured to:
   for each result data stream:
      utilize the metric name of the publish block as an attribute describing the result data stream; and
      store the attribute based on the metric name with metadata describing the result data stream.

15. The system of claim 9, wherein one or more data streams from the data streams are generated as result data streams obtained as a result of execution of another set of instructions.

16. The system of claim 9, wherein metadata describing the data streams is received independent of a data of one of the data streams.

17. A non-transitory computer-readable storage medium comprising instructions stored thereon, which when executed by a one or more processors, cause the one or more processors to perform operations for processing a dynamically changing set of data streams, comprising:
   receiving a set of instructions comprising at least a find block associated with a search expression, the search expression based at least in part on an attribute that describes multiple data streams and evaluate the search expression to identify a set of data streams conforming to the search expression, and providing data generated by instrumented software;
   executing the find block, during a time interval determined based on a periodicity associated with the find block, to determine a set of data streams from the data streams that satisfies the search expression;
   selecting, from multiple data streams, a data stream that has a largest periodic time interval that is smaller than the time interval based on the periodicity associated with the find block;
   generating one or more result data values based on the executing, the result data values corresponding to the data stream;
   causing display of the data streams through a user interface, wherein the data streams are associated with a publish block, the publish block associated with a metric name; and
   for each data stream:
      utilizing the metric name of the publish block as an attribute describing the data stream; and
      storing the attribute based on the metric name with metadata describing the data stream.

18. The non-transitory computer-readable storage medium of claim 17, wherein the set of instructions comprise a grouping command, specifying grouping of data across data streams, wherein the grouping command identifies one or more attributes.

19. The non-transitory computer-readable storage medium of claim 18, wherein the grouping command, groups data of the data streams by a set of metadata attributes and each result data stream corresponds to a distinct set of values of the set of metadata attributes.

20. The non-transitory computer-readable storage medium of claim 17, wherein evaluation of the find block is triggered by events occurring in an instrumentation analysis system that processes data streams based on instructions specified in a data stream language.

* * * * *